US009442689B2

(12) United States Patent
Chi et al.

(10) Patent No.: US 9,442,689 B2
(45) Date of Patent: Sep. 13, 2016

(54) WEARABLE GLASS-TYPE TERMINAL, SYSTEM HAVING THE SAME AND METHOD OF CONTROLLING THE TERMINAL

(71) Applicant: LG ELECTRONICS INC., Seoul (KR)

(72) Inventors: Jumin Chi, Seoul (KR); Jinwook Ro, Seoul (KR); Yeseul Jang, Seoul (KR); Inyong Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 106 days.

(21) Appl. No.: 14/455,599

(22) Filed: Aug. 8, 2014

(65) Prior Publication Data
US 2015/0061969 A1 Mar. 5, 2015

(30) Foreign Application Priority Data

Aug. 30, 2013 (KR) .................. 10-2013-0104320

(51) Int. Cl.
| | |
|---|---|
| *G06F 17/28* | (2006.01) |
| *G06F 3/01* | (2006.01) |
| *G06F 3/02* | (2006.01) |
| *G06F 3/048* | (2013.01) |
| *G06T 19/00* | (2011.01) |
| *G06K 9/00* | (2006.01) |
| *G02B 27/01* | (2006.01) |
| *G06F 3/14* | (2006.01) |

(52) U.S. Cl.
CPC ........... *G06F 3/1454* (2013.01); *G02B 27/017* (2013.01); *G06F 3/013* (2013.01)

(58) Field of Classification Search
CPC .... G06F 17/289; G06F 3/013; G06F 3/1454; G06Q 30/0261; G02B 27/017
See application file for complete search history.

(56) References Cited

U.S. PATENT DOCUMENTS

| | | | | |
|---|---|---|---|---|
| 6,346,929 B1 * | 2/2002 | Fukushima | ............. | G06F 3/017 345/156 |
| 8,836,768 B1 * | 9/2014 | Rafii | ................ | G06F 3/017 345/420 |
| 2008/0009324 A1 * | 1/2008 | Patel | ................ | H04B 17/318 455/566 |
| 2009/0099836 A1 * | 4/2009 | Jacobsen | ............ | G06F 17/289 704/3 |

(Continued)

FOREIGN PATENT DOCUMENTS

WO 2013/121249 8/2013

OTHER PUBLICATIONS

Turner, et al., "Combining Gaze with Manual Interaction to Extend Physical Reach," 1st International Workshop on Pervasive Eye Tracking and Mobile Eye-based Interaction, PETMEI '11, Sep. 2011, XP055057128, pp. 33-36.

(Continued)

*Primary Examiner* — Lin Li
(74) *Attorney, Agent, or Firm* — Lee, Hong, Degerman, Kang & Waimey PC; Jonathan Kang; Justin Lee

(57) ABSTRACT

The present disclosure provides a wearable glass-type terminal including a body that is formed to be worn on a user's face, a wireless communication unit that is wirelessly connected to an input device and a plurality of output devices and configured to receive data from the input device and transmit data to the output devices, a camera that is mounted to the body and configured to detect one of the plurality of output devices, and a controller that is configured to control the wireless communication unit to transmit data received from the input device to the output device detected by the camera.

19 Claims, 23 Drawing Sheets

(56) References Cited

U.S. PATENT DOCUMENTS

| | | | |
|---|---|---|---|
| 2011/0261176 A1* | 10/2011 | Monaghan, Sr. | G02B 27/017 348/61 |
| 2013/0050258 A1* | 2/2013 | Liu | G06T 19/006 345/633 |
| 2013/0083025 A1 | 4/2013 | Gibson et al. | |
| 2013/0147686 A1 | 6/2013 | Clavin et al. | |
| 2013/0219272 A1* | 8/2013 | Balasubramanian | G06F 3/023 715/704 |
| 2014/0192085 A1* | 7/2014 | Kim | G06T 19/006 345/633 |
| 2015/0009190 A1* | 1/2015 | Kuwahara | G09G 3/2092 345/205 |
| 2015/0016674 A1* | 1/2015 | Cho | G06K 9/00335 382/103 |
| 2015/0177981 A1* | 6/2015 | Starner | G06F 3/04883 345/173 |

OTHER PUBLICATIONS

European Patent Office Application Serial No. 14002846.5, Search Report dated Jan. 19, 2015, 9 pages.

\* cited by examiner

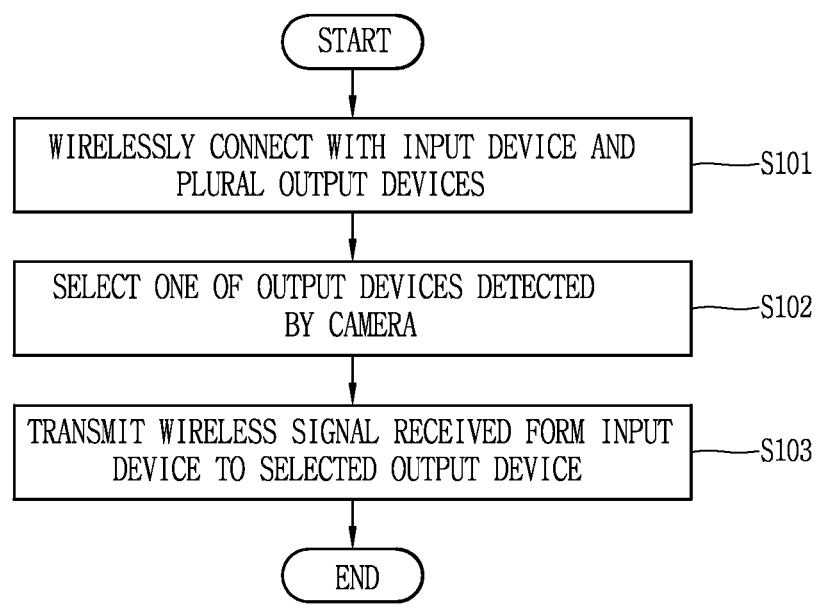

FIG. 5B
(a) 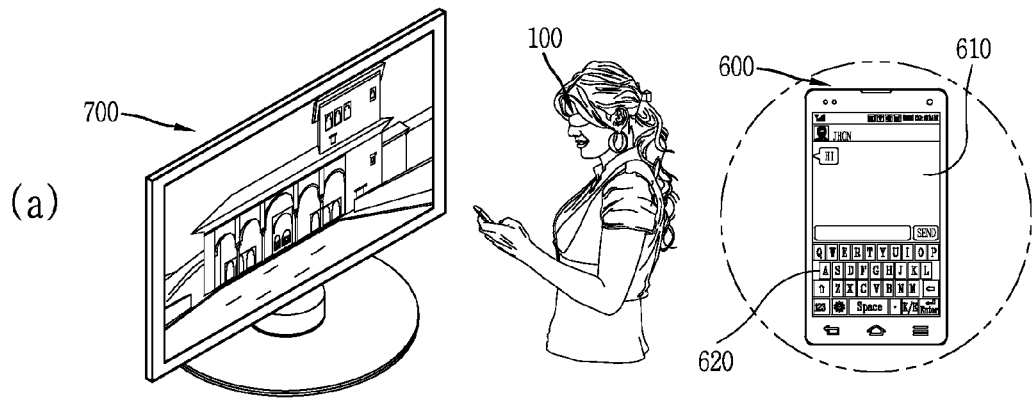
(b) 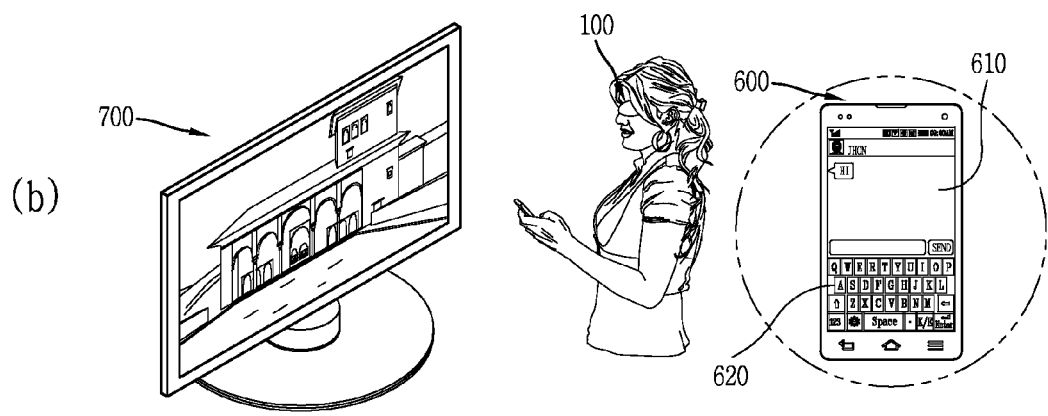
(c) 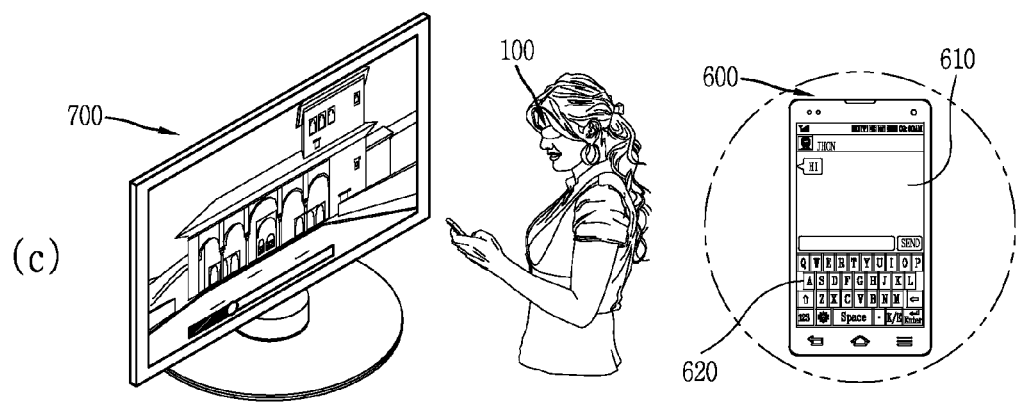

FIG. 9B
(a) 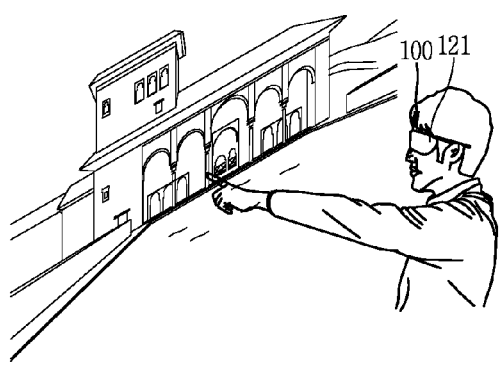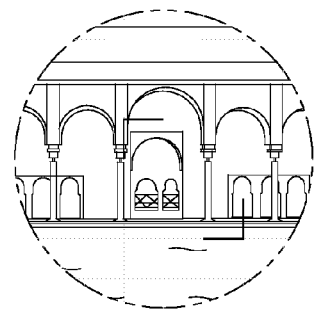
(b) 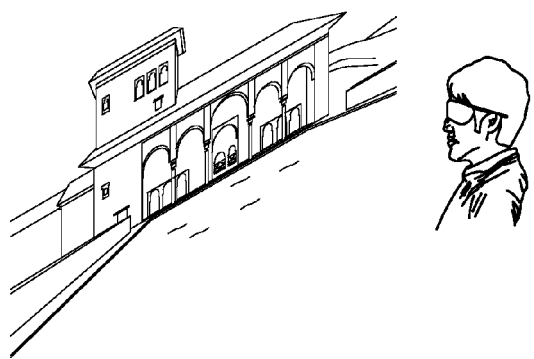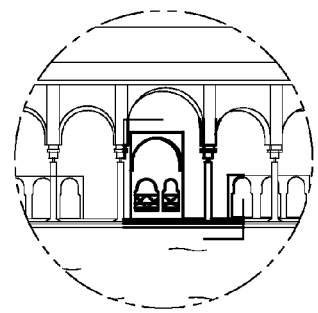

WEARABLE GLASS-TYPE TERMINAL, SYSTEM HAVING THE SAME AND METHOD OF CONTROLLING THE TERMINAL

CROSS-REFERENCE TO RELATED APPLICATION

Pursuant to 35 U.S.C. §119(a), this application claims the benefit of earlier filing date and right of priority to Korean Application No. 10-2013-0104320, filed on Aug. 30, 2013, the contents of which is incorporated by reference herein in its entirety.

BACKGROUND OF THE DISCLOSURE

1. Field of the Disclosure

This specification relates to a wearable glass-type terminal, capable of acquiring information related to a user's eye line (or a movement of user's eyes), and a data output system thereof.

2. Background of the Disclosure

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player.

Many efforts include not only changes and improvement of structural components implementing a mobile terminal but also software improvement to support and improve functions of the terminal.

In recent time, studies on an interworking system, which allows for sharing various data stored in each terminal through interworking with various electronic devices, are undergoing. Also, a technology of controlling a plurality of electronic devices using a single input device is realized in products.

Accordingly, a user can improve work efficiency by simultaneously utilizing a plurality of devices for works or using a plurality of devices supporting different functions. However, there is inconvenience in view of using input devices for controlling the plurality of devices, respectively, or having to change a control target.

SUMMARY OF THE DISCLOSURE

Therefore, an aspect of the detailed description is to provide a data output system, capable of selecting a control target based on user's eyes (or eye line).

To achieve these and other advantages and in accordance with the purpose of this specification, as embodied and broadly described herein, there is provided a wearable glass-type terminal including a body that is formed to be worn on a user's face, a wireless communication unit that is wirelessly connected to an input device and a plurality of output devices and configured to receive data from the input device and transmit data to the output devices, a camera that is mounted to the body and configured to detect one of the plurality of output devices, and a controller that is configured to control the wireless communication unit to transmit data received from the input device to the output device detected by the camera.

In accordance with one exemplary embodiment, the data may correspond to at least a part of screen information output by the output device.

In accordance with one exemplary embodiment, the controller may continuously transmit data only to one of the plurality of output devices, which interworks with the input device, when a control command is continuously input to the input device interworking with the one output device.

In accordance with one exemplary embodiment, the controller may restrict the data transmission to the output device detected by the camera while the control command is input.

In accordance with one exemplary embodiment, the wearable glass-type terminal may further include a memory that is configured to store at least one data output to a first output device, detected by the camera, among the plurality of output devices, based on a first control command input by the input device.

In accordance with one exemplary embodiment, the controller may control the wireless communication unit to transmit data stored in the memory to a second output device, detected by the camera, based on a second control command input by the input device.

In accordance with one exemplary embodiment, the controller may activate the camera to detect one output device of the plurality of output devices when an event is received in the one output device, which is wirelessly connected to the input device.

In accordance with one exemplary embodiment, the body may include a touch sensing unit that is formed at one side of the body and configured to sense a user's touch input, and the controller may control the wireless communication unit to transmit a control command based on a touch input to one output device, detected by the camera, when the touch input is applied to the body while the one output device is detected by the camera.

In accordance with one exemplary embodiment, the wearable glass-type terminal may further include a memory. Here, the controller may control the memory to store at least a part of screen information output to the one output device based on a first touch input applied to the touch sensing unit, and control the wireless communication unit to transmit information related to the screen information to another output device, which is detected due to a movement of user's eyes, based on a second touch input applied to the touch sensing unit.

In accordance with one exemplary embodiment, the wearable glass-type terminal may further include a display unit that is configured to output screen information such that the user recognizes the screen information along with an external environment, and the controller may control the display unit to output an indicator including information related to at least one output device when the at least one output device is detected by the camera.

In accordance with one exemplary embodiment, the wearable glass-type terminal may further include a display unit that is configured to output screen information such that a user recognizes the screen information along with an external environment, and the controller may control the display unit to output at least a part of screen information output to the one output device.

In accordance with one exemplary embodiment, the camera may obtain an image based on a control command applied to the glass-type terminal, and the controller may control the wireless communication unit to transmit data associated with the image to an output device detected by the camera after the image is obtained.

In accordance with one exemplary embodiment, the control command may correspond to a preset gesture of a hand captured by the camera.

In accordance with one exemplary embodiment, the image-associated data may further include execution information related to an application required by the detected output device to output the image.

To achieve these and other advantages and in accordance with the purpose of this specification, as embodied and broadly described herein, there is provided a data output system including a plurality of output devices, an input device that is configured to receive a control command for outputting data to at least one of the plurality of output devices, and a glass-type terminal that is configured to be worn on a user's face, wherein the glass-type terminal may include a body that is formed to be worn on the user's face, a wireless communication unit that is wirelessly connected to the input device and the plurality of output devices, a camera that is mounted to the body and configured to detect one of the plurality of output devices, and a controller that is configured to control the wireless communication unit to transmit data to the output device detected by the camera.

In accordance with one exemplary embodiment, the controller may transmit to the input device information related to a control command received from the first output device for controlling a first output device, detected by the camera for a preset time, among the plurality of output devices.

In accordance with one exemplary embodiment, the input device may include a touch screen that is configured to output a graphic image receiving a user's touch input, and the touch screen may output an icon for controlling the first output device based on the received information.

In accordance with one exemplary embodiment, the first output device detected by the camera may output a cursor corresponding to a control command applied to the input device, and the cursor may be output to at least one of the first output device and a second output device based on the control command when the first output device and the second output device are detected by the camera.

In accordance with one exemplary embodiment, the first output device detected by the camera may output an icon, to which a control command is applied, along with screen information, and the controller may control the wireless communication unit to receive a wireless signal associated with a part of the screen information based on the control command applied to the icon.

In accordance with one exemplary embodiment, the glass-type terminal may further include a display unit that is disposed on the body, and the display unit may output at least a part of the screen information based on the received wireless signal.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 4 is a flowchart illustrating a control method for a mobile terminal in accordance with one exemplary embodiment disclosed herein;

FIGS. 5A and 5B are conceptual views illustrating the control method of FIG. 4;

FIGS. 9A to 9D are conceptual views illustrating a control method based on a user gesture applied to a wearable glass-type device.

DETAILED DESCRIPTION OF THE DISCLOSURE

Hereinafter, the present disclosure will be explained in more detail with reference to the attached drawings. For the sake of brief description with reference to the drawings, the same or equivalent components will be provided with the same reference numbers, and description thereof will not be repeated. The suffixes "module" and "unit or portion" for components used in the following description merely provided only for facilitation of preparing this specification, and thus they are not granted a specific meaning or function. If it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC and an ultra book. However, it will be obvious to those skilled in the art that the present disclosure may be also applicable to a fixed terminal such as a digital TV and a desktop computer, except for specific configurations for mobility.

Figure 1:
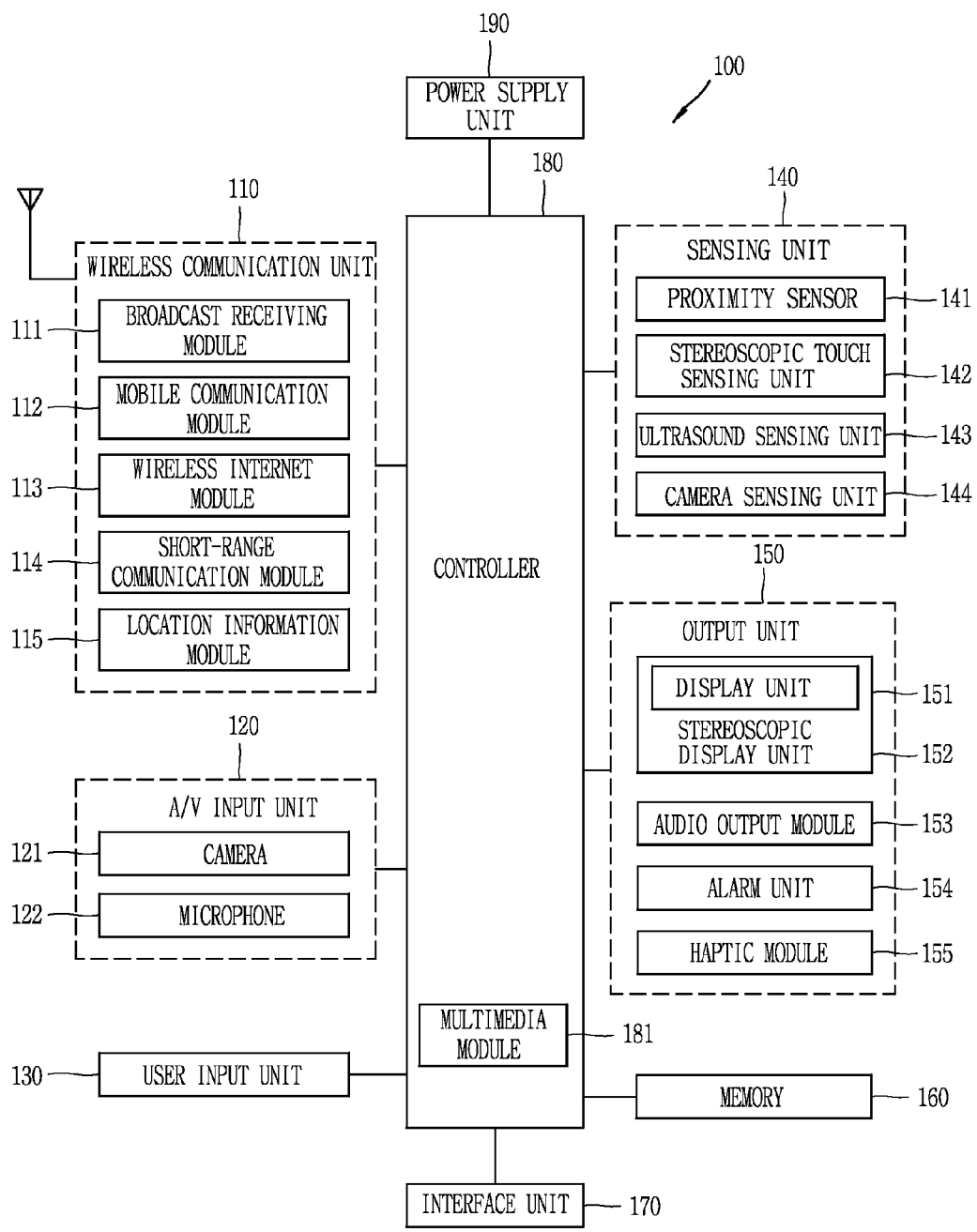
FIG. 1 is a block diagram of a mobile terminal in accordance with one exemplary embodiment of the present disclosure.

FIG. 1 is a diagram illustrating a mobile terminal according to one embodiment of the present invention.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component 110 to 190 is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like. The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module or a wireless fidelity (WiFi) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, a switchable scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor may have a more extended lifespan and higher utilization than the contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'floating touch' or 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera 121, a photo sensor, and a laser sensor.

For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the mobile terminal 100 according to the present disclosure will be described.

Figure 2A:
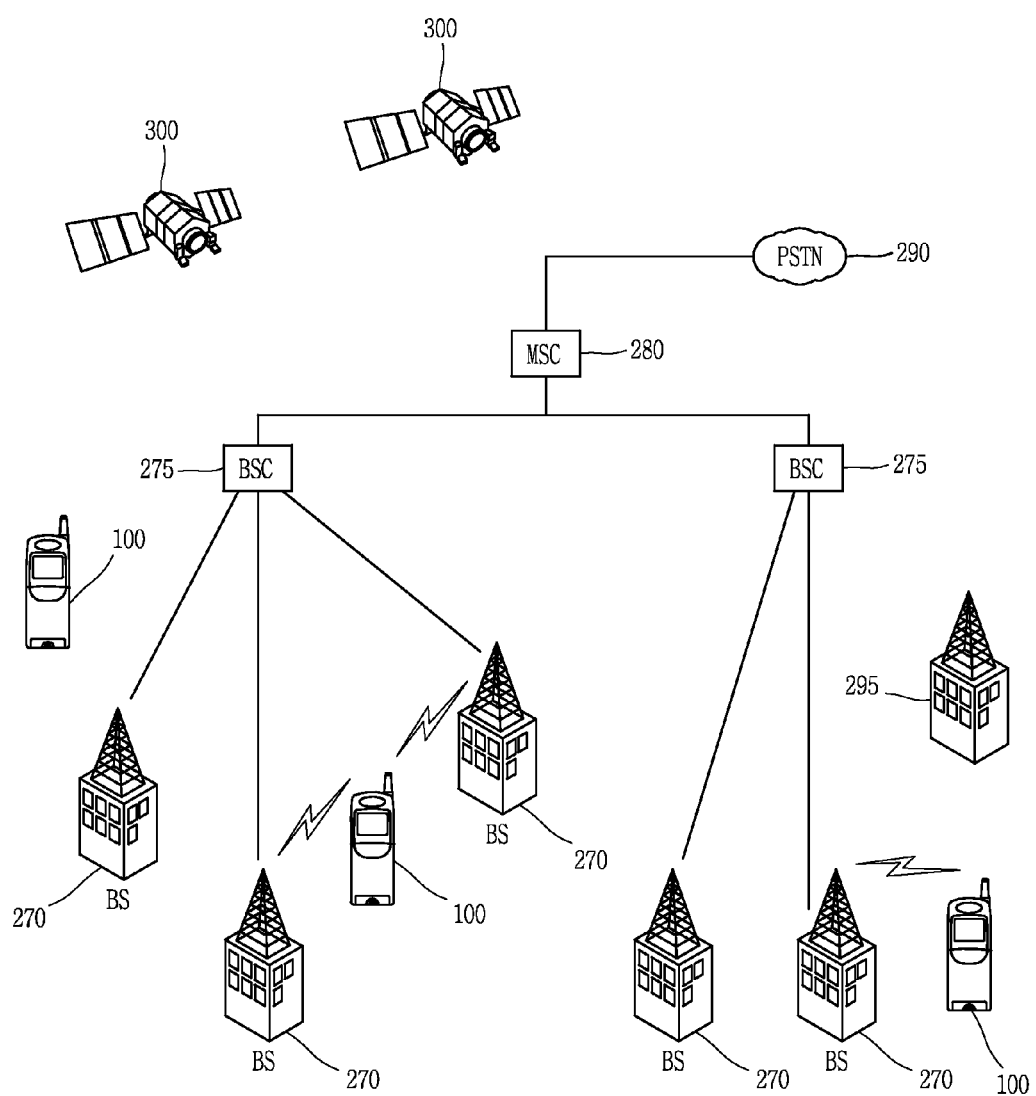
FIGS. 2A and 2B are conceptual views of a communication system operable with a mobile terminal disclosed herein.
Figure 2B:
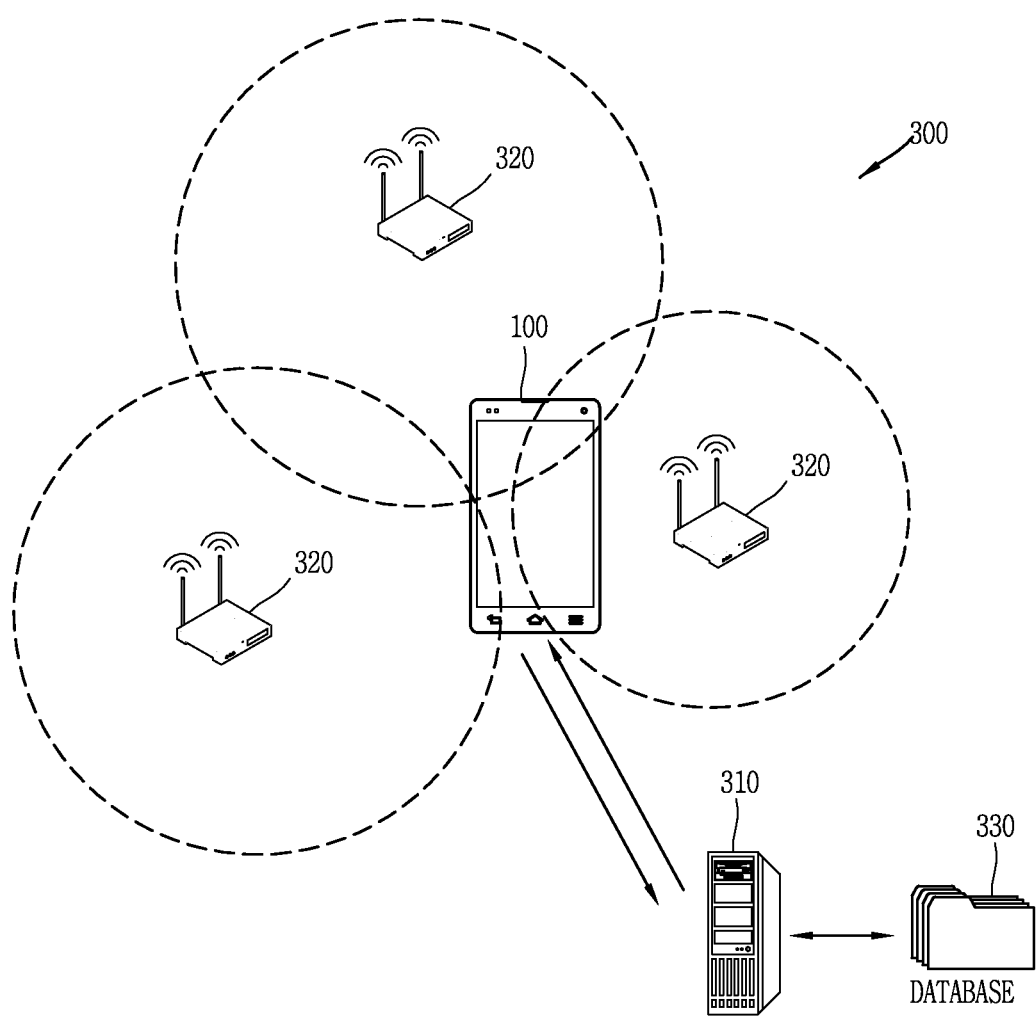

FIGS. 2A and 2B are conceptual views of a communication system operable with a mobile terminal 100 in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminals 100 operating within the system. The broadcast receiving module 111 (FIG. 1) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminals 100. Two satellites are depicted in FIG. 2A, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Figure 3A:
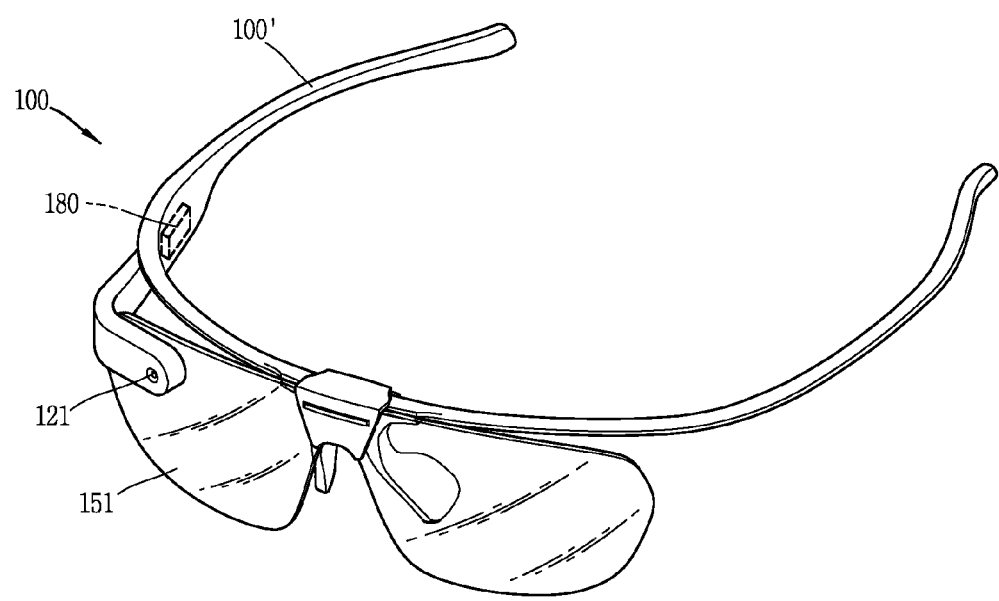
FIG. 3A is a front perspective view of one exemplary embodiment of a wearable glass-type device (terminal) disclosed herein.

FIG. 3A is a front perspective view of one exemplary embodiment of a wearable glass-type device (terminal) disclosed herein. As illustrated in FIG. 3A, a wearable glass-type terminal 100 according to the present disclosure may include a main body 100', a display unit 151, and a controller 180.

The wearable glass-type terminal 100 may further include a user input unit, a voice recognizing unit, and an operation sensing unit.

The wearable glass-type terminal 100 disclosed herein may be implemented into a head mounted display (HMD), specifically, smart glasses.

The main body 100' may be mountable on a head. For example, the main body 100' may be implemented by a frame and a temple in case of the smart glasses.

The display unit 151 may be coupled with the main body 100' and arranged at positions corresponding to both eyes. Also, the display unit 151 may be light-transmittable and output visual information.

The visual information refers to a virtual object, which is generated in the wearable glass-type terminal 100 or input from an external device. For example, the virtual object may refer to an application or an icon corresponding to the application, a content, a UI in a phone call mode, and the like. The virtual object may be generated by the controller 180 or received from a mobile terminal, such as a smart phone. Here, since the display unit 151 is light-transmittable, a user can view external environments through the display unit 151.

Also, in one exemplary embodiment, the display unit 151 may allow for a user to view the external environment therethrough and simultaneously output information related to an external object which constructs the external environment. For example, the external object may be a name card, a person or a mutual communication-available external device.

As aforementioned, the controller 180 may control the wearable glass-type terminal 100. In detail, the controller 180 may output information relating to an external device, which has been detected by a wireless communication unit 110, to the display unit 151.

For example, the controller 180 may identify a position of the detected external device. Here, the controller 180 may determine whether or not the detected external device is located within a user's view, and decide according to the determination result whether or not to output information related to the detected external device.

The controller 180 may also be mounted to the main body 100' of the wearable glass-type terminal 100, or integrally formed with the main body 100'. As another example, the controller 180 may be spaced apart from the main body 100'.

The camera 121 may be provided on a front surface of at least one of the left-eye and right-eye display units 151. Or, the camera 121 may be provided at one side or both sides of the frame 310 to capture even a space outside the user's view.

The user input unit 130 may be implemented as a separate touch panel at one side or both sides of the frame 310. Or, the user input unit 130 may be implemented as a physical key. For example, a power on/off switch may be provided at one side of the frame 310.

As another example, the user input unit 130 may be implemented as a separate external device connected to the main body 100', such that the user can input a specific command to the separate external device. Or, the display unit 151 may be implemented as a touch screen so as to receive a control command directly from the user.

As another example, the user input unit 130 may be implemented as a module for recognizing a user's voice command, such that the user can input a specific command to the main body 100' by use of voice.

Meanwhile, as one example of a wearable glass-type terminal, smart glasses are released. The smart glasses implemented as a wearable device may execute functions, which have been executed in a mobile terminal, in a simple manner.

The display unit 151 of the smart glasses can simultaneously output the external environment viewed through the display unit 151 and the output visual information (i.e., realizing augmented reality). This may allow a user to more easily recognize information related to an object which configures the external environment.

Figure 3B:
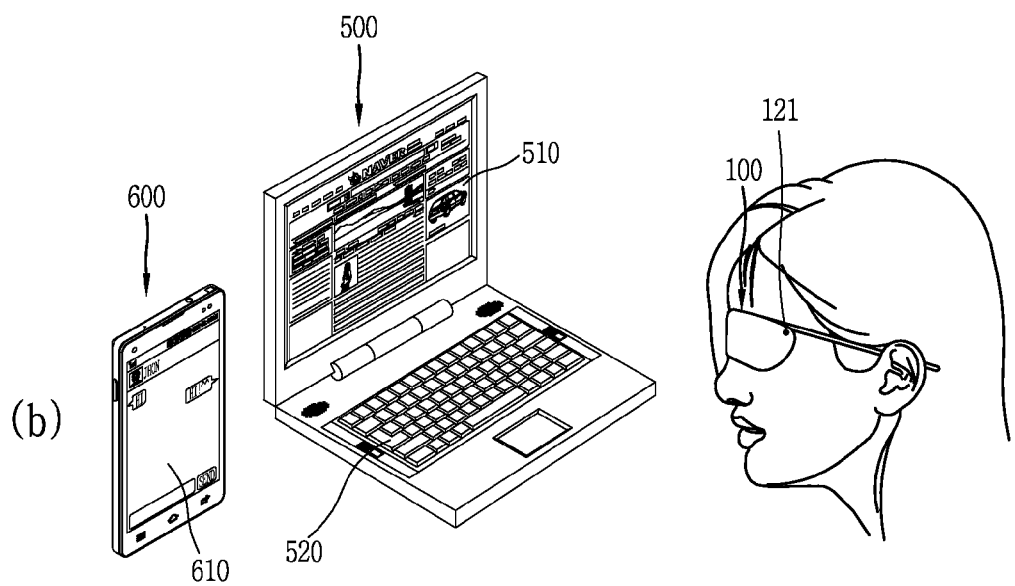
FIG. 3B is a conceptual view illustrating one exemplary embodiment of a wearable glass-type device (terminal) connected with an input device and an output device in a wireless manner.

Also, the smart glasses may execute wireless communications with other smart glasses, or with an external device which can communicate with the smart glasses. Here, information related to the external device may be output on the display unit. FIG. 3B is a conceptual view of a data output system configured as a glass-type terminal which is wirelessly connected to an input device and a plurality of output devices. The glass-type terminal 100 may execute transmission and reception of wireless signals with the input device and the plurality of output devices by a wireless communication unit 110.

For example, the input device, the plurality of output devices and the glass-type terminal may be wirelessly connected to one another through a Bluetooth (BT) and WiFi connections. Or, some components of each device may transmit and receive signals in a wired manner.

For example, the data output system may include a first device 500 having a first output unit 510 and an input unit 520, and a second device 600 having a second output unit 610. The first device 500 may correspond to a laptop computer which includes a screen corresponding to the first output unit 510 to output visual data, and a keyboard corresponding to the input unit 220. The second device 600 may correspond to a portable terminal which includes an output unit (or display unit) for outputting visual data. Here, the portable terminal outputting the visual data may receive a user's touch input. That is, the display unit of the portable terminal may also serve as an input unit.

According to this exemplary embodiment, the data output system may include at least one input device (the input unit 220 of the first device 500) and at least two output devices (the output unit 510 of the first device 500 and the second device 600). Also, the system may include additional output device and input device.

As illustrated above, one of the input device and the output device may be configured as an electronic device, but may not be limited thereto. For the sake of explanation, an output unit and an input unit will be defined as an output device and an input device, respectively. That is, an output device and an input device explained hereinafter may be implemented in one product.

According to the present disclosure, a user may control data, which is output to an output device, using an input device while wearing a glass-type terminal. That is, the user may control data output to an output device of a different electronic device by using an input device. A device to which data is output is defined as an output device detected by the camera 121 of the glass-type terminal 100.

Hereinafter, description will be given in detail of an output method of a data output system with reference to the accompanying drawings.

Figure 5A:
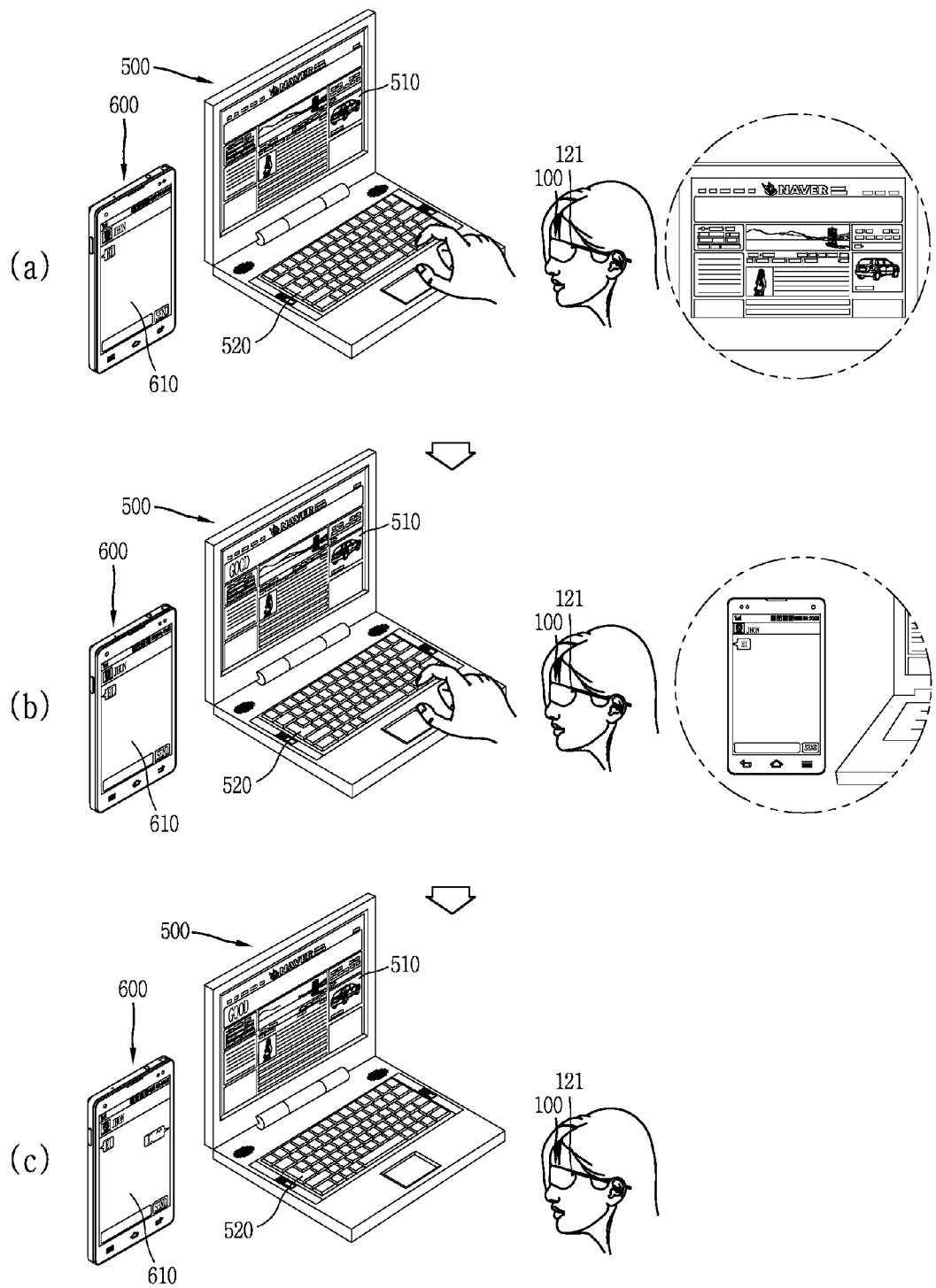

FIG. 4 is a flowchart illustrating a control method for a glass-type terminal included in a data output system in accordance with one exemplary embodiment disclosed herein, and FIG. 5A is a conceptual view illustrating the control method of FIG. 4.

An input unit 520 and a plurality of output devices 500 and 600 may be wirelessly connected (S101). The input unit 520 and the plurality of output devices 500 and 600 may also be connected in the wireless manner or a wired manner. As illustrated in FIGS. 4 and 5A, the output unit 510 and the input unit 520 may correspond to components of one electronic device.

When the glass-type terminal 100 is connected with the input unit 520 and the plurality of output devices 500 and 600, the camera 121 which is mounted adjacent to a user's eye may detect the input unit 520 and the output devices 500 and 600. That is, a device detected by the camera 121 may change in response to the change of the user's eye line (or a movement of the user's eyes). The controller may select one output device which has been detected by the camera 121, from the plurality of output devices (S102).

The controller may transmit a wireless signal received from the input unit 520 to the selected output device (S103).

Referring to (a) and (b) of FIGS. 5A, a user may input data by applying a control command to the input unit 520. For example, the user may press the input unit configured as a keyboard, to generate a control command for generating text. The control command for generating the text may be output to the first output unit 510 which is integrally formed with the keyboard.

Here, according to this exemplary embodiment, the controller may control the wireless communication unit 110 to receive a wireless signal corresponding to the control command from the input unit 520. The controller may control the wireless communication unit 110 to transmit the wireless signal to one output device when the one output device is selected by the camera 121.

The controller may analyze an object included in an image of an external environment which is acquired by the camera 121, and determine presence or absence of a device which matches the analyzed object, among devices wirelessly connected to the glass-type terminal 100. When there is no matched device, the controller may apply a control command to an output unit which is connected to the first input unit 520 in a wired manner or integrally configured within the first input unit 520.

Referring to (b) and (c) of FIG. 5A, the camera 121 may detect the second device 600 along a movement of the user's eyes. The controller may select the second device 600, and control the wireless communication unit 110 to transmit the wireless signal received from the input unit 520 to the second device 600.

For example, the second device 600 may include a display unit as a second output unit 610, and the display unit may be touch sensitive. That is, the second device 600 may further include an input unit as well as the second output unit 610.

The second output unit 610 of the second device 600 may output data based on the wireless signal received from the glass-type terminal 100. The second device 600 may output the data corresponding to the wireless signal to be appropriate for the second output unit 610. That is, the first and second output units 510 and 610 may output data of different formats based on a user's control command applied to the first input unit 550.

The data input system according to the present disclosure may include a plurality of input units. Referring to (a) of FIG. 5A, the system may include an additional input device (not illustrated). For example, the additional input device may correspond to a mouse connected to the first device 500. The controller may transmit a wireless signal to the first or second device 500 or 600 to control screen information of the first output unit 510 or the second output unit 520 according to a control command generated by the mouse.

According to the present disclosure, an output device detected by a camera may be controllable by use of a user's control command applied to substantially the same input device. That is, an output device to which a control command is to be applied may be selected based on the user's eyes. This may allow for controlling an output device meeting a user's intent using a single input device, without a separate selection for selecting the output device.

As described above, the second device 600 may further include an output unit. Hereinafter, description will be given of a control method for forming an input unit 620 on the second device 600 for controlling a third device according to a movement of user's eyes, with reference to FIG. 5B.

Referring to FIG. 5B, the second and third devices 600 and 700 may interwork with each other. The second device 600 may correspond to a mobile terminal and the third device 700 may correspond to an image display device (for example, TV, etc.). That is, FIG. 5B illustrates a situation that the user manipulates the second device 600 while viewing an image output to a third output unit 710 of the third device 700. An output unit of the second device 600 according to this exemplary embodiment may be implemented as a touch screen which receives a user's touch input while outputting visual data. That is, the output unit of the second device 600 may output a soft key, which is formed to execute a preset function, by receiving a user's touch input, if necessary.

Referring to (b) of FIG. 5B, the controller may detect the third device 700 by the camera according to the movement of the user's eyes. When the third device 700 is detected by the camera for a preset time t, the controller may transmit a wireless signal to the second device 600 to form the second input unit 620 for the control of the third device 700.

At least one region of the second output unit 610 may be converted into the second input unit 620. The second input unit 620 may include at least one graphic image which receives a user's touch input. For example, the second input unit 620 may include icons for controlling the third device 700. That is, the second input unit 620 may include icons for changing a channel output to the third device 700 or adjusting a volume level.

That is, when the third device 700 is detected by the camera 121, the controller may receive a control command input by a touch input applied to the second input unit 620 and transmit the received control command to the third device 700. Meanwhile, when the second device 600 is detected again by the camera 121, the controller may allow the second output unit 610 to be controlled by the control command generated by the touch input applied to the second input unit 620.

A form of the second input unit 620 may be implemented substantially the same while controlling the second output unit 610 or the third device 700. Therefore, different devices detected by the camera 121 may be controllable by a touch input which is applied to substantially the same icon.

Consequently, one input device (or an input unit configuring one device) may be allowed to selectively control an output device detected based on a user's eye line, among output devices (or output units configuring one device) which wirelessly communicate with each other.

FIGS. 6A to 6D are conceptual views illustrating a control method for outputting data in accordance with various exemplary embodiments.

Figure 6A:
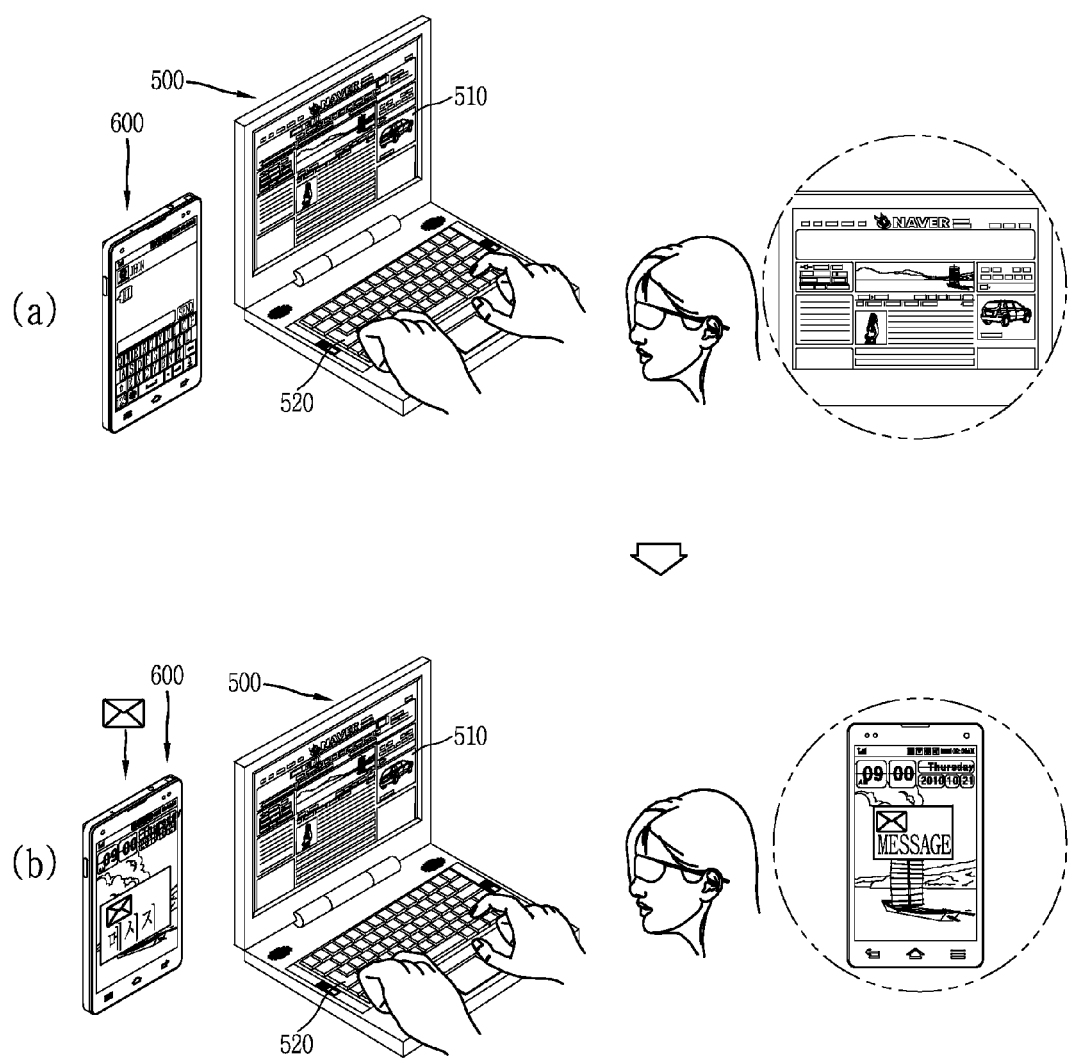
FIGS. 6A to 6D are conceptual views illustrating a control method for outputting data in accordance with various exemplary embodiments.

Hereinafter, a control command in case where a continuous input is applied will be described with reference to FIG. 6A. The system may include the first and second devices 500 and 600 and the glass-type terminal 100, which are connected together in a wireless manner. The camera 121 of the glass-type terminal 100 may sense (detect) one of the first and second devices 500 and 600. Also, the controller may transmit a wireless signal of data input by the first input unit 520, in order to output the data to the first device 600 or the first output unit 510 sensed by the camera 121.

If the user continuously inputs data to the first input unit 520, the controller may control the data to be output to the first output unit 510 even when the second device 600 is detected by the camera 121. For example, when a control command is continuously input to the first input unit 520, the control command may be applied to the first device 500 even if the user's eyes are moved from the first device 500 to the second device 600.

When the input of the control command by the first device 500 is stopped and the second device 600 is detected by the camera 121 due to the change of the user's eye line, the controller may change an object, to which the control command input by the first input unit 520 is to be applied, into the second device 600.

According to this exemplary embodiment, when a user continuously inputs a control command using an input unit, the change of the user's eye line (namely, the change of an output device detected by the camera) may not be processed as the change of a device to which the control command is to be applied. This may result in more precisely recognizing a user's intent for changing a target device.

Meanwhile, when the continuous input is stopped, a device detected by the camera may be controlled.

Hereinafter, a control method in case where the continuous input is stopped will be described with reference to FIG. 6B. As illustrated in FIG. 6A, when the user's control command is continuously input to the first input unit 520, the first output unit 510 may be controlled by the control command even if the second device 600 is detected by the camera 121.

Figure 6B:
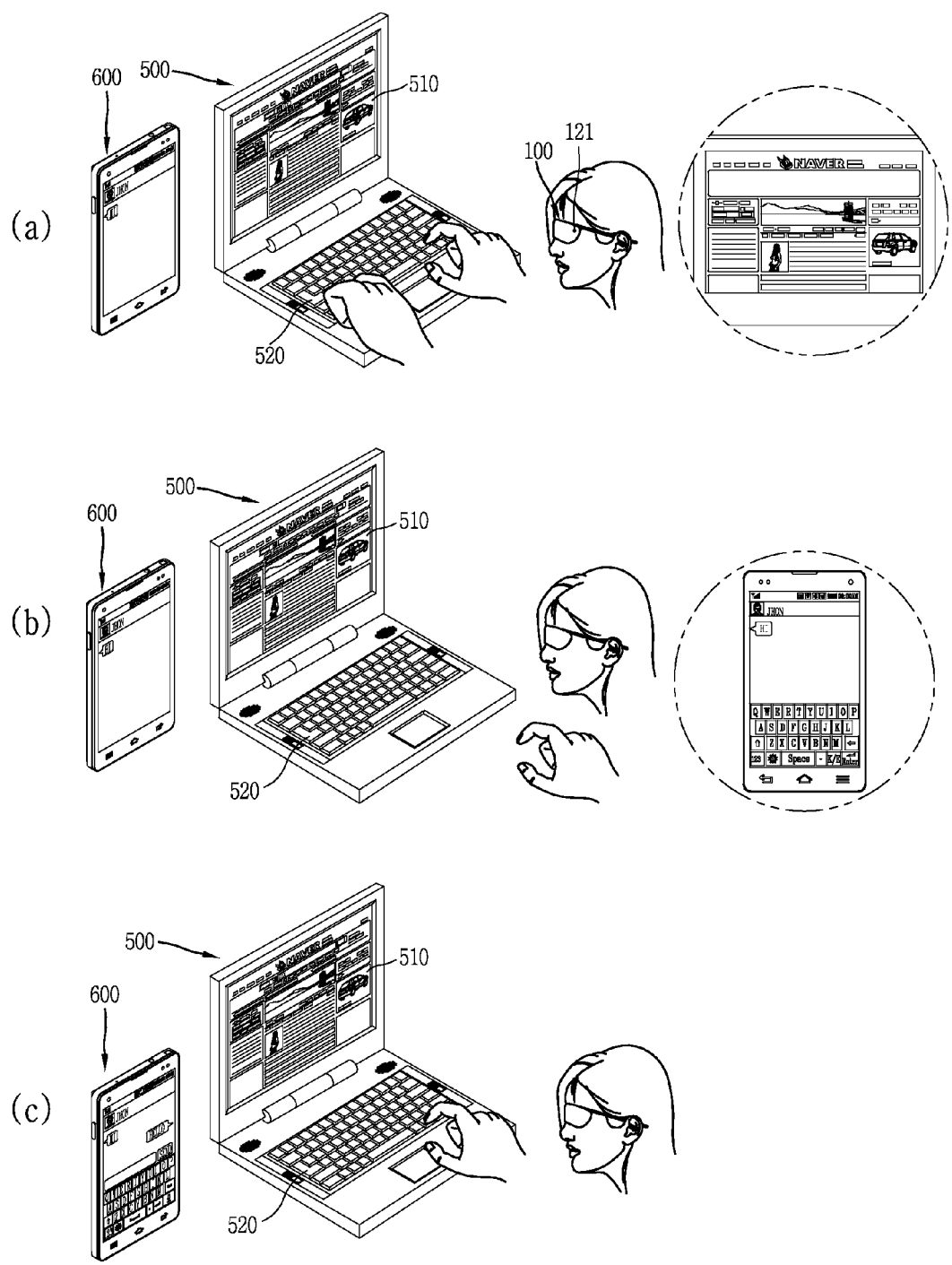

Referring to (b) of FIG. 6B, when the input of the control command to the first input unit 520 is stopped, the controller may select the device detected by the camera 121 as a control target.

While the second device 600 is continuously detected by the camera 121 along the user's eyes (or the user's eye line), the control command which is continuously applied to the first input unit 520 may be applied to the first device 500. Here, when the continuously-applied control command is not applied any more, the controller may change the control target from the first device 500 to the second device 600. That is, when an additional control command is applied to the first input unit 520, the controller may control the wireless communication unit 110 to receive a wireless signal associated with the control command and transmit the received wireless signal to the second device 600.

Whether the continuously-applied control command is not applied any more may be determined based on whether or not an input is applied to the first input unit 520 for a preset time t. This may result in more precise recognition of the user's intent.

Figure 6C:
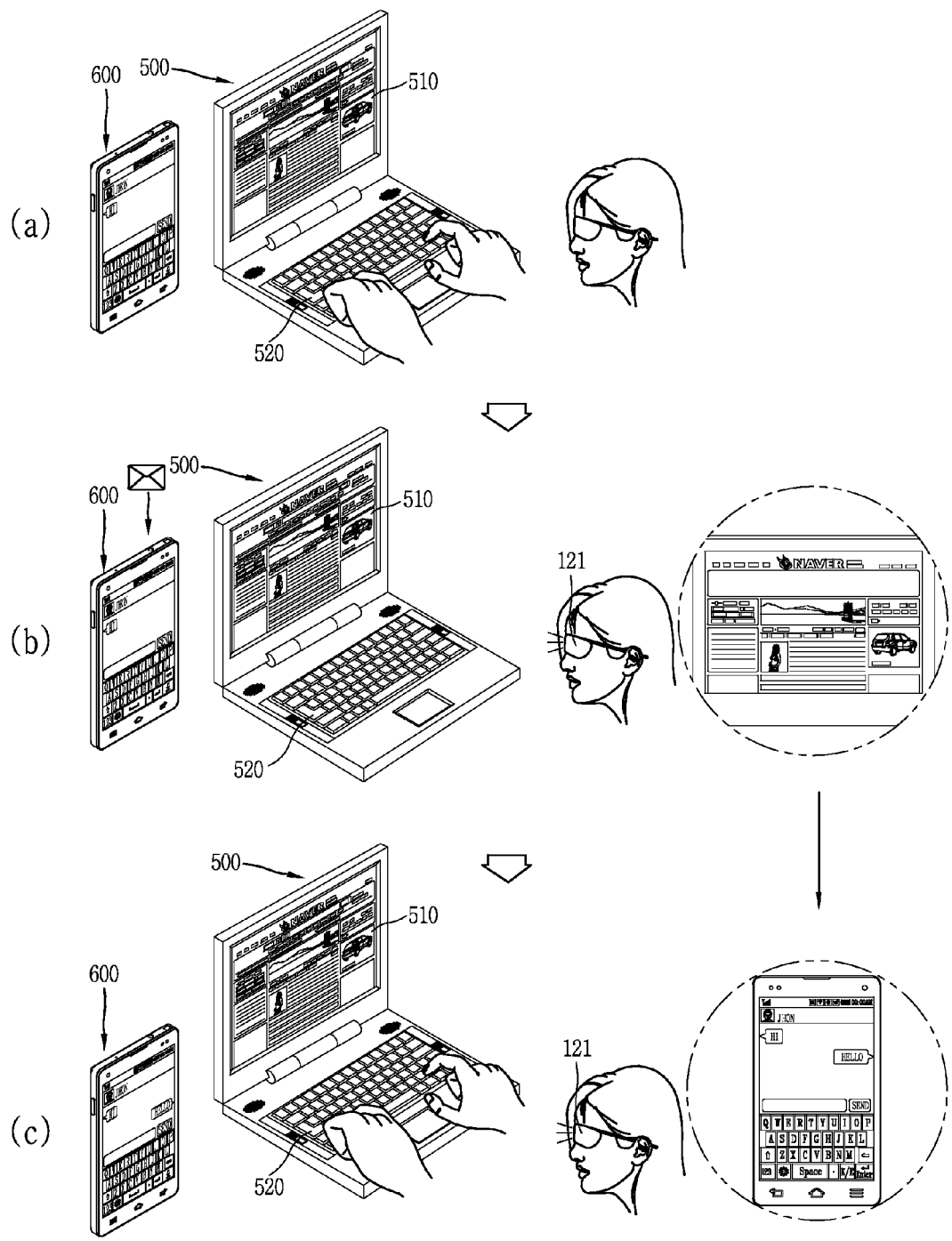

Hereinafter, a control command for activating a camera detecting a device will be described with reference to FIG. 6C. As illustrated in (a) of FIG. 6C, while the first and second devices 500 and 600 and the glass-type terminal 100 are interworking with each other, the camera 121 may be continuously turned off. Although not illustrated in the drawing, since any device is not detected by the camera 121, the control command input by the first input unit 520 may be output to the first output unit 510 even if the user's eye line changes.

Meanwhile, when an event is received in the second device 600, the controller may activate the camera 121. That is, when the event is received in the second device 600, the wireless communication unit 110 may receive a wireless signal associated with the event reception, and the controller may activate the camera 121 based on the wireless signal.

In response to the activation of the camera 121, the controller may control the wireless communication unit 110 to transmit a wireless signal associated with a control command, which is input by the first input unit 520, to a device which is detected by the camera 121.

According to this exemplary embodiment, although a plurality of devices are interworking with each other, if it is not necessary to change a target device, to which a control command is to be applied, according to the movement of the user's eyes, a camera may be deactivated so as to reduce power consumption.

However, the present disclosure may not be limited to this. For example, the camera 121 may be maintained in a turn-on state while the first and second devices 500 and 600 and the glass-type terminal 100 are interworking with each other or while the user inputs a control command. Or, the camera 121 may be manually turned on or off by the user, or repetitively turned on or off at a preset short time interval.

Hereinafter, a control method for outputting data stored in a glass-type terminal to a selected output device will be described with reference to FIG. 6D. The controller may control the memory 160 to store a part of data of a device wirelessly connected with the glass-type terminal according to a control command.

For example, the controller may receive a part of data output to the first output unit 510 in the form of a wireless signal based on a COPY control command which is input to the first input unit 520, and store the received part of data in the memory 160. The memory 160 may temporarily store the data, or continuously store the data in a preset space according to a user's control command.

Figure 6D:
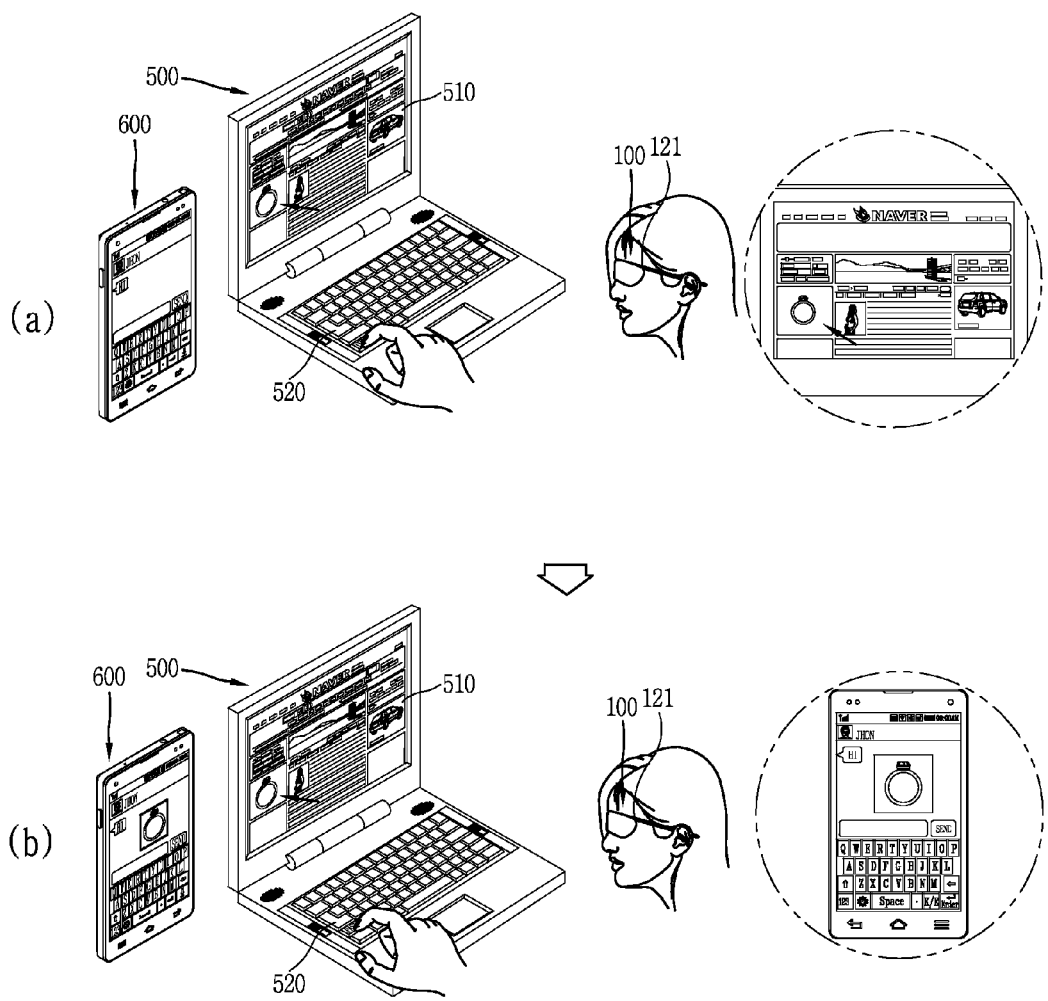

Referring to (a) of FIG. 6D, when a control command for copying at least part of data output to the first output unit 510 is applied by the first input unit 520 of the first device 500, the controller may receive the control command and control the memory 160 to store the at least part of the data.

That is, the first device 500 may transmit a wireless signal associated with data, which is selected to be copied based on the control command, to the glass-type terminal 100. The glass-type terminal 100 may receive the wireless signal and temporarily store the received wireless signal in the memory 160. Meanwhile, the first device 500 may transmit the selected data to the glass-type terminal 100 and also store the selected data in a separate storage space within the first device 500.

Referring to (b) of FIG. 6D, the controller may output the selected data based on a PASTE control command, which is applied to the first input unit 520. The controller may transmit a wireless signal such that the data can be output to an output device detected by the camera 121.

For example, when the second device 600 is detected by the camera 121, the controller may control the wireless communication unit 110 to transmit a wireless signal associated with the stored data to the second device 600. Upon reception of the wireless signal, the second device 500 may output the data to the output unit (or display unit).

When a specific application is executed in the second device and an execution screen of the application is output to the output unit (or display unit) of the second device 600, the output unit (or display unit) of the second device 600 may output the data on the execution screen.

According to this exemplary embodiment, the memory included in the glass-type terminal 100 may execute an intervention function, which may allow a control command, for which a temporary storage space is required, to be selectively applied to different devices.

Figure 7A:
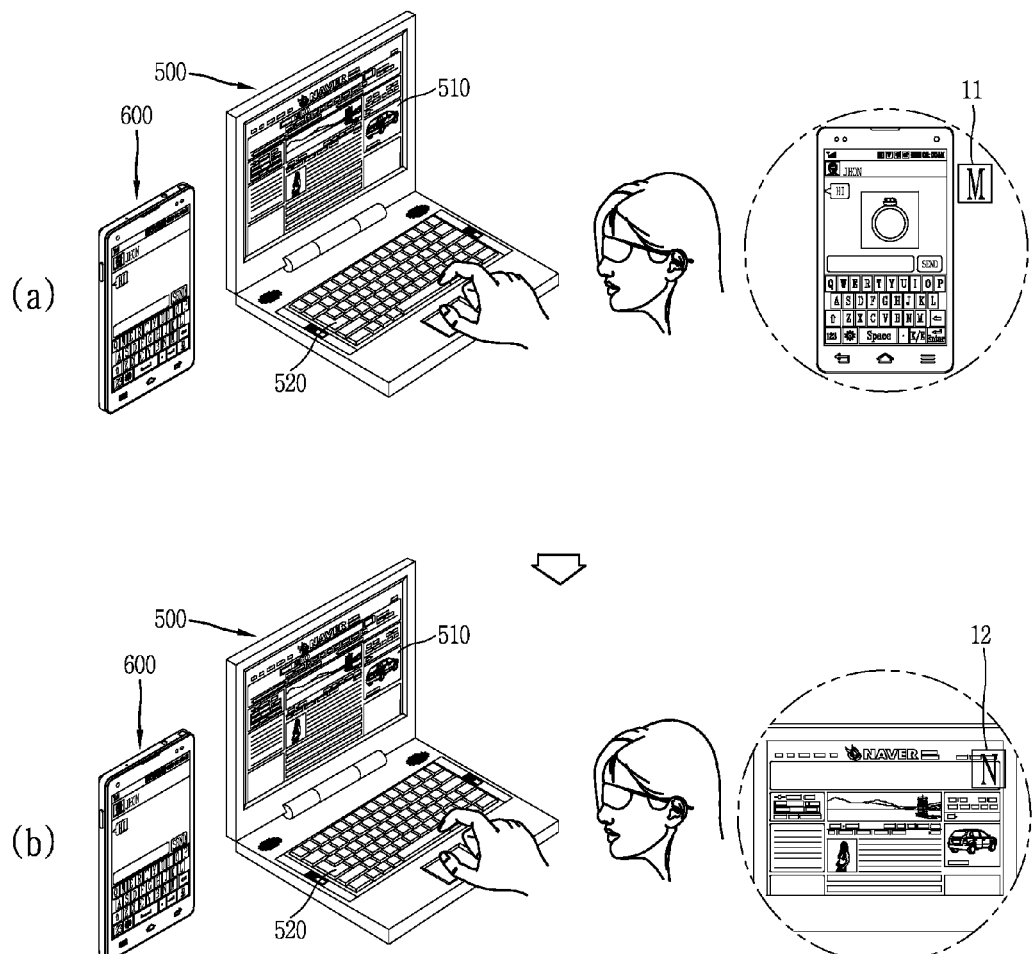
FIGS. 7A to 7C are conceptual views illustrating a control method of a system using indicators output on a display unit.
Figure 7B:
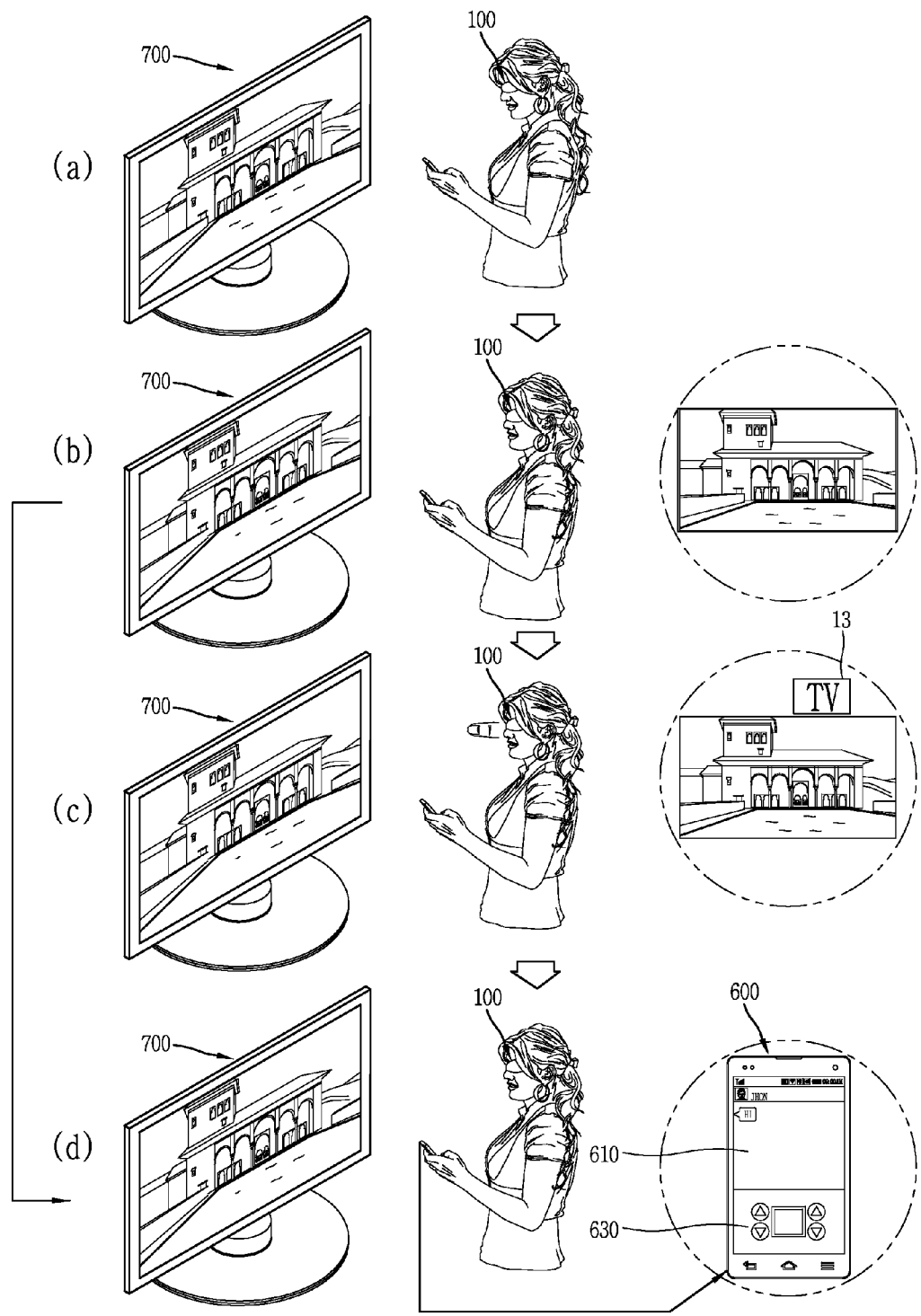
Figure 7C:
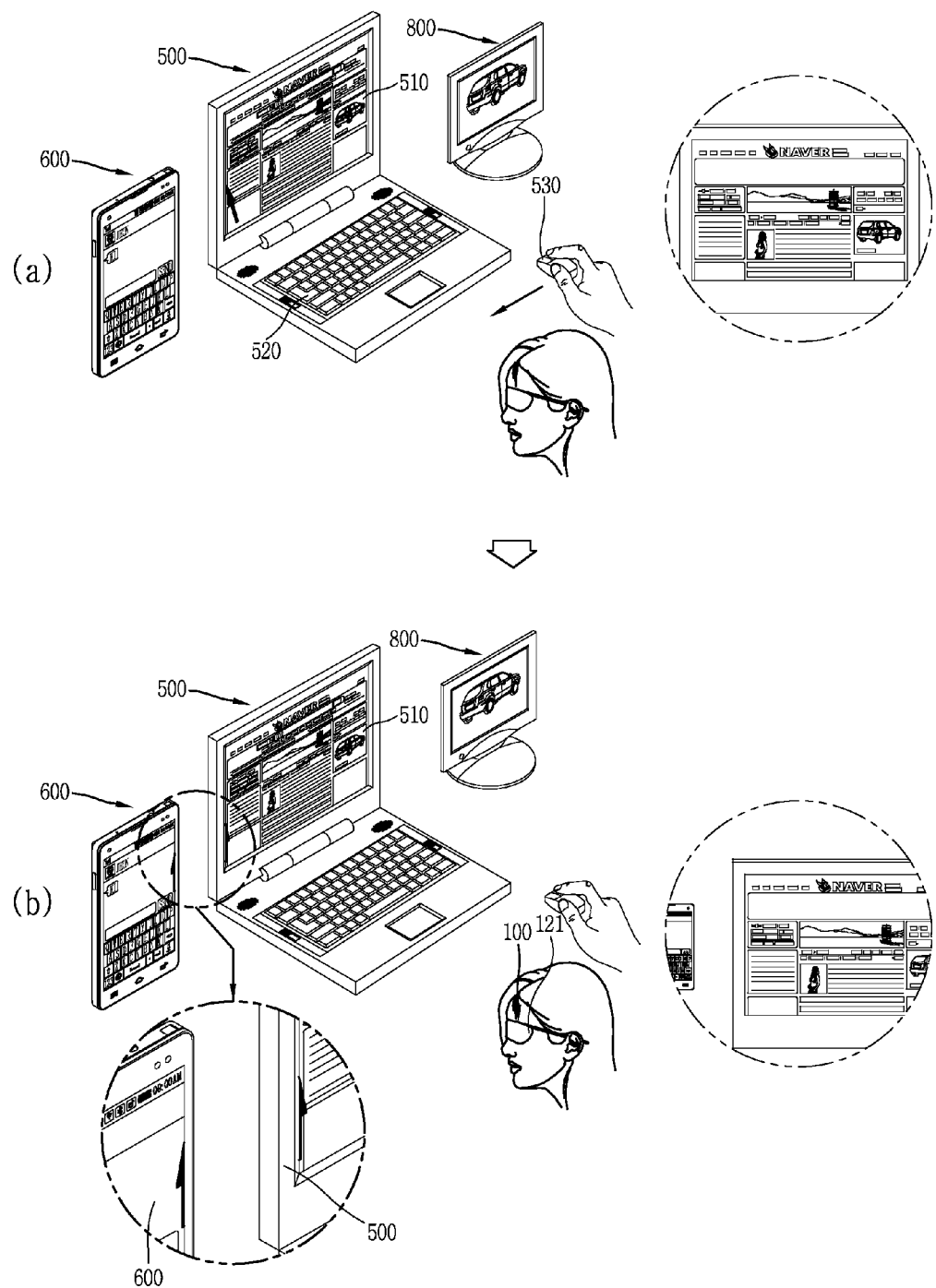

FIGS. 7A to 7C are conceptual views illustrating a control method for a system using indicators output on a display unit.

Hereinafter a control method for outputting an indicator indicating information related to a detected device will be described with reference to FIG. 7A. The controller may decide one device to which a control command is to be applied in a manner of analyzing an external environment detected by the camera 121. For example, when only the first device 500 is detected by the camera 121, the controller may decide the first device as a target to which a wireless signal associated with the control command is to be transmitted.

When the first device 500 is detected, the controller may recognize a type of the first device 500, and control the display unit 151 to output a first indicator 11 thereon. The first indicator 11 may include information related to the first device 500. For example, the first indicator 11 may correspond to a character, an image and the like, which indicate the first device 500. FIG. 7A illustrates the first indicator 11 in the form of a character indicating the first device 500, but the first indicator 11 may further include additional information. For example, the first indicator 11 may further include information related to the type of the first device 500, an identification number, user information, a current active/inactive state and the like.

The first indicator 11 may be output as a semitransparent image and overlap an actual external environment which is viewed through the glass-type terminal 100. That is, the user can simultaneously view the continuously output first indicator 11 together with the external environment along the movement of the eyes.

Also, when the second device 600 is detected in response to the movement of the eyes, the controller may control the display unit 151 to change the first indicator 11 into a second indicator 12 associated with the second device 600. The second indicator 12 may include information related to the second device 600.

Although not illustrated, when both of the first and second devices 500 and 600 are detected by the camera 121, the controller may output both of the first and second indicators 11 and 12. Also, when a part of the first device 500 and a part of the second device 600 are detected at once, the controller may select a device with a more detected region as a target device to which the control command is to be applied. In this case, the controller may control the display unit to output an indicator associated with the selected device.

The indicators may allow the user to recognize a device, which has been selected such that a control command input by an input unit is applied thereto.

Hereinafter, a control method further employing an input unit for controlling a detected device will be described with reference to FIG. 7B. While the second and third devices 600 and 700 are wirelessly connected to each other, the second device 600 may include a second output unit 610 and a third input unit 630. The second output unit 610 and the third input unit 630 may be formed on a touch screen which receives a user's touch input. That is, the third input unit 630 may be implemented as a virtual keyboard or a soft key receiving the user's touch input. One region on the touch screen corresponding to the second output unit 610 may also be formed to receive the user's touch input.

FIG. 7B illustrates a status that the second output unit 610 and the third input unit 630 of the second device 600 are output and an image is output on the third device 700 wirelessly connected to the second device 600.

Referring to (b) of FIG. 7B, the third device 700 may be detected by the camera 121 according to the movement of the user's eyes.

Referring to (b) and (c) of FIG. 7B, when the third device 700 is detected, the controller may control the display unit to output a third indicator 13 associated with the third device 700. The controller may also control the camera 121 to detect a gesture of the user who is located to overlap the third indicator 13. For example, if a user's hand which is arranged to overlap the third indicator 13 at the user's viewing angle is located at a preset interval from the display unit 151, the controller may recognize the user's hand as a control command applied to the third indicator 13.

Referring to (d) of FIG. 7B, the controller may control the third input unit 630, which is needed to control the third device 700, to be formed on the display unit of the second device 600 based on a user's gesture applied to the third indicator 13. The third input unit 630 may be implemented into the form of an icon for controlling the third device 700. That is, the controller may control the wireless communication unit to receive information required for controlling the third device 700 from the third device 700, and transmit the information to the second device 600. The information required for the control of the third device 700 may correspond to information related to a graphic image corresponding to at least one function of the third device 700 and a control command corresponding to the graphic image.

The display unit of the second device 600 may output the third input unit 630 for controlling the third device 700 on a preset region. The third input unit 630 may receive a user's touch input applied to the display unit, and the second device 600 may generate a control command for controlling the third device 700 based on the user's touch input. The second device 600 may transmit a wireless signal associated with the control command to the third device 700.

Meanwhile, referring to (b) and (d) of FIG. 7B, when the third device 700 is detected by the camera 121, the controller may control the wireless communication unit 110 to receive information related to the control command for controlling the third device 700. That is, irrespective of the step of inputting the gesture to the third indicator 13 illustrated in (c) of FIG. 7B, the controller of the glass-type terminal 100 may transmit the information related to the control command to the second device 600.

The shape (or form) of the third input unit 630 may not be limited to the illustrated one. For example, the third input unit 630 may have substantially the same shape as the second input unit 620. Also, only the third device 700 may be controlled in response to the touch input applied to the second input unit 620 and the control of the second device 600 may be restricted.

Although not illustrated, the third device 700 may be implemented as various devices, in addition to the image display device, and the third input unit 630 may be implemented into different shapes with respect to the various devices.

According to this exemplary embodiment, an input unit which is applied to a device detected in response to the movement of the user's eyes may be provided. Also, since the input unit is implemented by a soft key output to a touch screen, a user may be provided with input units which generate different control commands according to a detected device.

Hereinafter, a control command for outputting a cursor according to a device detected by a camera will be described with reference to FIG. 7C.

As illustrated in (a) of FIG. 7C, the first device 500 may be connected to an input device 530. For example, the input device 530 may correspond to a mouse, a touch pen and the like. The first output unit 510 of the first device 500 may output a cursor based on a control signal applied by the input device 530. The cursor may be output to a position corresponding to a movement of the input device 530.

The controller may control the cursor to be output within the first output unit 510 according to the movement of the input device 530 when the first device 500 is detected by the camera 121. Here, shapes of the first and second devices 500 and 600 detected by the camera 121 may be full shapes or partial shapes.

Referring to (b) of FIG. 7C, when the first and second devices 500 and 600 are detected by the camera 121, the controller may control the input device 530 to select one of the first and second devices 500 and 600. Also, based on the movement of the input device 530, the display unit of the second device 600 may output the cursor. In this case, the cursor output to the first output unit 510 may disappear.

As illustrated, the cursor may be partially output to the first and second devices 500 and 600 in a dividing manner. That is, when both of the first and second devices 500 and

600 are detected by the camera 121, the controller may define the first output unit 510 and the display unit as continuous output regions.

A fourth apparatus 800 may also be disposed adjacent to the first device 500. That is, the second and fourth apparatuses 600 and 800 may be arranged adjacent to left and right sides of the first device 500, respectively, and may be wirelessly connected to one another.

Although not illustrated in detail, when the first, second and fourth apparatuses 500, 600 and 800 adjacent to one another are detected by the camera 121, the controller may receive information related to a moved position of the input device 530, and control each of the first, second and fourth devices 500, 600 and 800 to selectively output the cursor according to the moved position-related information.

However, the controller may not transmit the control command input by the input device 530 to devices which are located adjacent to each other but have not been wirelessly connected to each other, and a device which has not been detected by the camera 121.

Therefore, the user may not only select a device, to which a control command is applied, according to the change of the eye line, but also more correctly input a control command to a desired device by recognizing a continuous output of a cursor when a plurality of devices are detected by a camera.

Figure 8A:
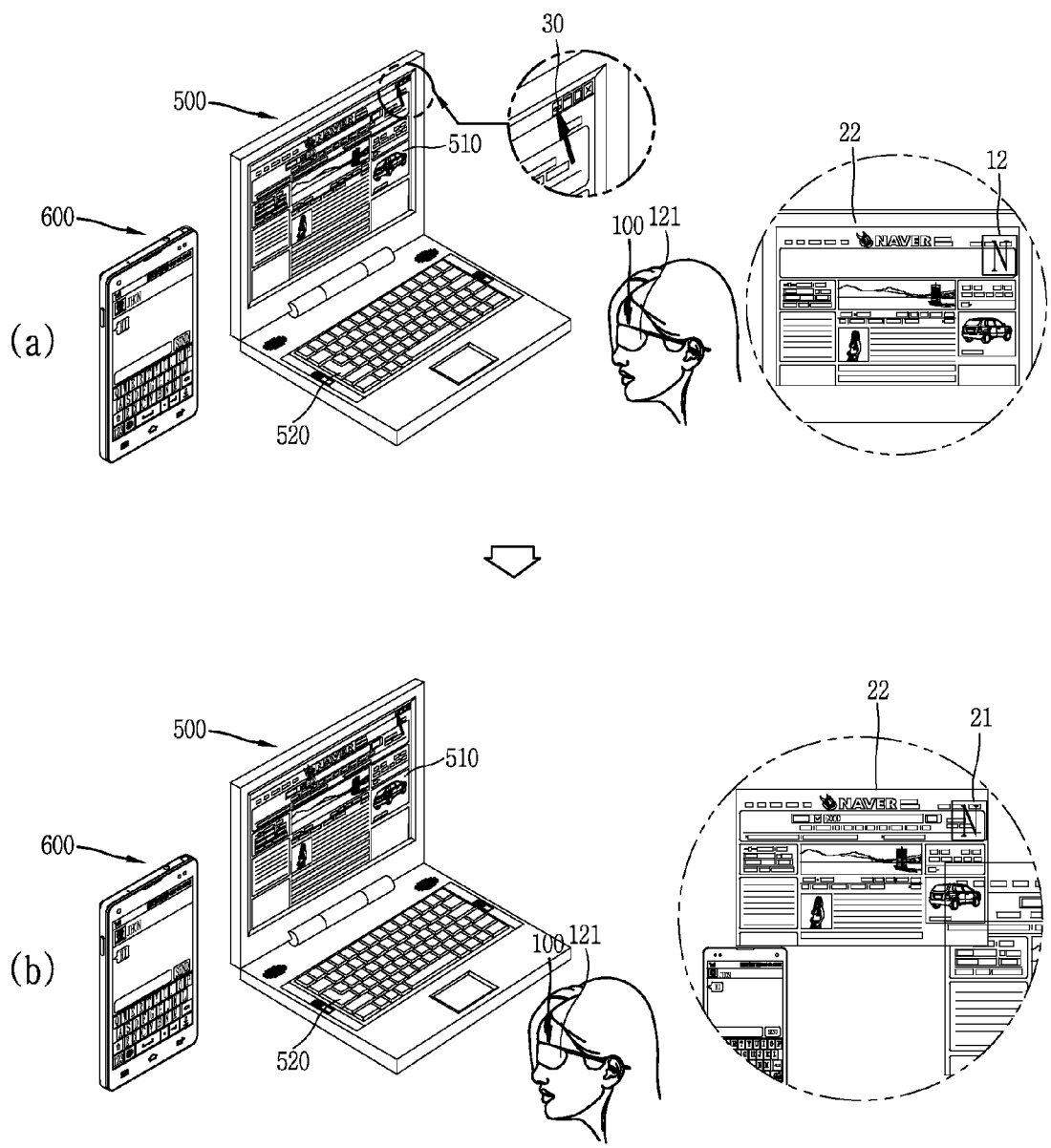
FIGS. 8A to 8C are conceptual views illustrating a control method for outputting data of an output unit to a display unit.
Figure 8B:
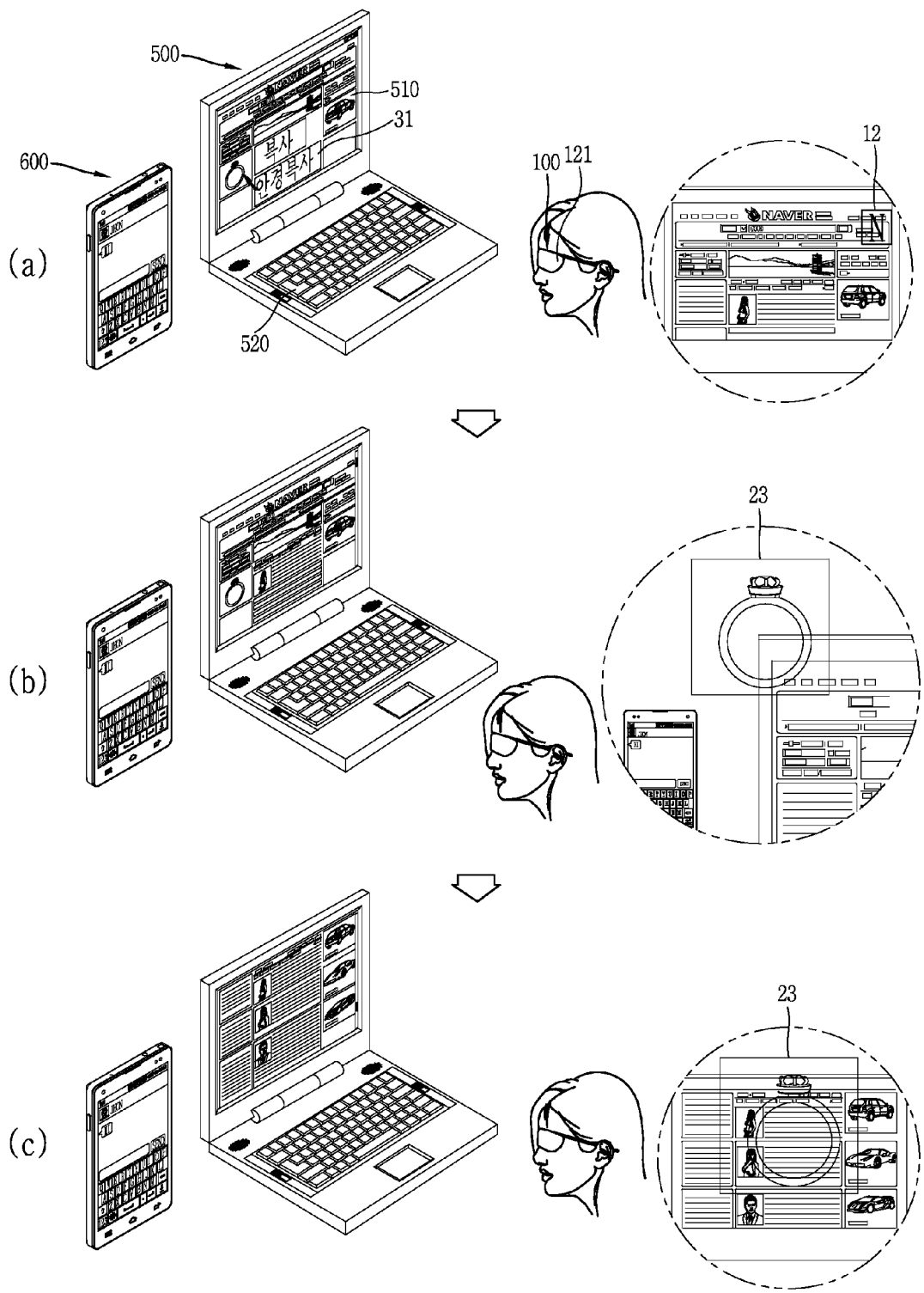
Figure 8C:
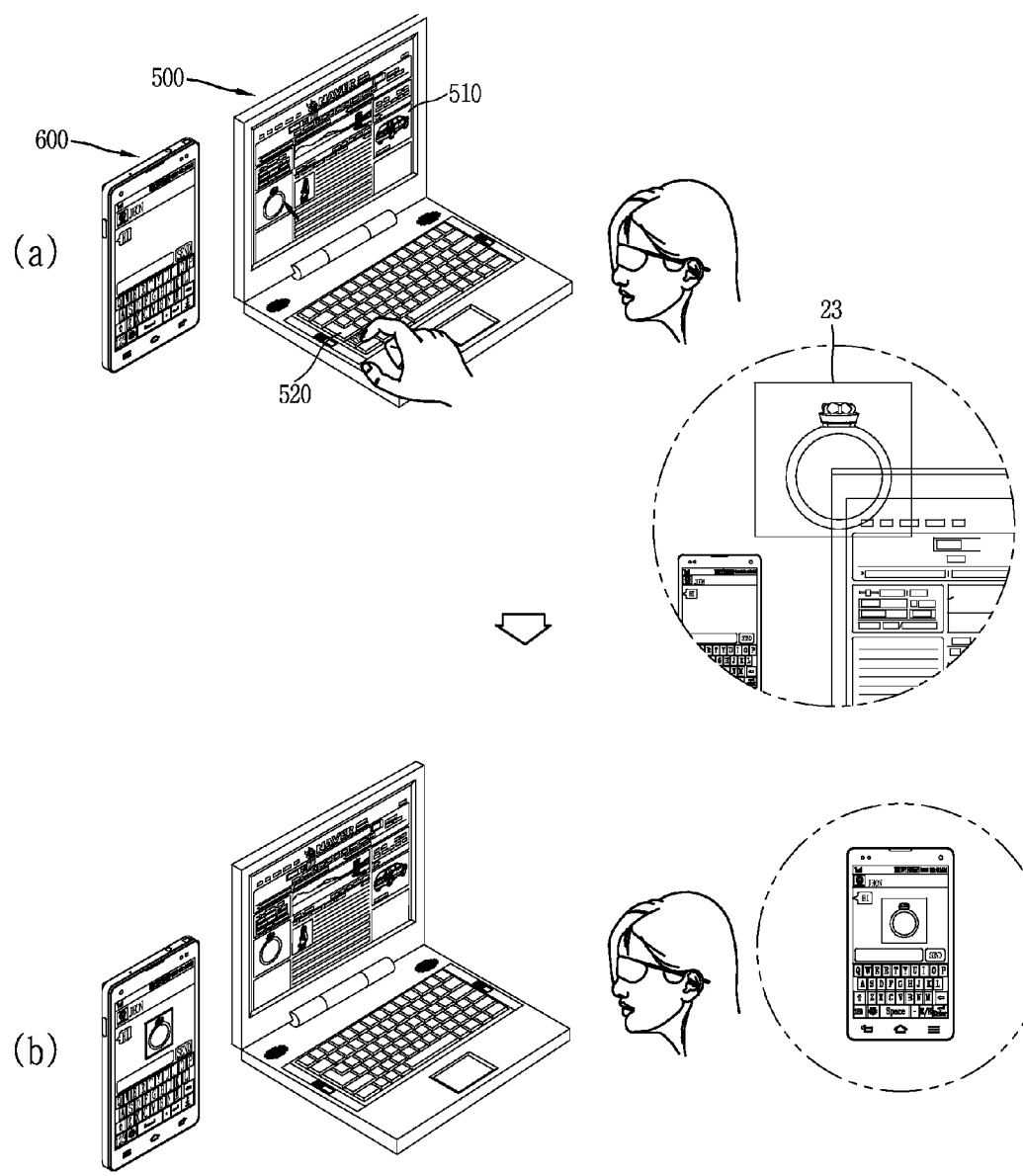

FIGS. 8A to 8C are conceptual views illustrating a control method for outputting data of an output unit on a display unit.

Hereinafter, a control command for outputting data in accordance with one exemplary embodiment will be described with reference to FIG. 8A. As illustrated in (a) of FIG. 8A, the first output unit 510 may output a first icon 30 receiving a control command for outputting data to the display unit.

The first device 500 may convert data displayed on the first output unit 510 into an image form when a control command is input to the first icon 30. The controller 180 of the glass-type terminal 100 may receive a wireless signal associated with the imaged data. That is, the first device 500 may capture at least part of the data output to the first output unit 510. The first device 500 may store the captured image in a storage space and transmit the captured image to the glass-type terminal 100.

Meanwhile, the controller may control the camera 121 by receiving a control command applied to the first icon 30. That is, when the glass-type terminal 100 receives the control command, the controller 180 may control the camera 121 to capture a current external environment. That is, the imaged data 22 may correspond to a photo obtained by the camera 121.

The controller 180 may also control the display unit to output the imaged data 22. The imaged data 22 may be output semitransparent. That is, the user may be provided with the imaged data 22 in an overlapped state with the external environment.

Referring to (b) of FIG. 8A, the controller may control the display unit 151 to output the imaged data 22 in a continuous manner even when another device is detected by the camera 121 in response to the movement of the user's eyes.

The second indicator 12 may also be output to overlap the imaged data 22. This may allow the user to recognize the source of the data.

The glass-type terminal according to this exemplary embodiment may separately output information required by the user who is simultaneously using a plurality of devices. Accordingly, the user can be continuously provided with required information while controlling other devices according to the movement of the eyes.

Hereinafter, a control method for outputting a part of data to the display unit will be described with reference to FIG. 8B. As illustrated in (a) of FIG. 8B, the first output unit 510 of the first device 500 may output a list for editing a part of data output to the first output unit 510. Here, the part of the data may correspond to an image, a video, a selected text, and the like. The list may be output based on a preset control command applied to the part of the data. The list may include a second icon 31 for outputting the part of the data to the glass-type terminal 100. For example, the preset control command may correspond to a right click of a mouse.

The first device 500 may image the part of the data and store the imaged part of the data in a separate storage space based on a user's control command applied to the second icon 31. The controller 180 of the glass-type terminal 100 may receive a wireless signal associated with the imaged part of the data. The controller 180 may control the display unit to output the part 23 of the data. The part 23 of the data may be output in a semitransparent state to overlap an external environment through the display unit.

Referring to (a) of FIG. 8B, the controller may control the display unit to continuously output the part 23 of the data while the camera 121 detects another device along with the movement (change) of the user's eyes.

Referring to (c) of FIG. 8B, even when another screen information is output to the first device 500 by a control command applied to the first device 500, the controller may also control the display unit to continuously output the part 23 of the data.

That is, the user may be continuously provided with selected data while receiving another screen information, without having to remember or separately store desired data.

Hereinafter, a control method for outputting data displayed on the display unit to an output device will be described with reference to FIG. 8C.

While the part 23 of the data is output to the display unit 151, the controller may receive a wireless signal associated with a control command applied to the first input unit 520. The controller may recognize a device detected by the camera 121 when receiving the wireless signal.

The controller 180 of the glass-type terminal 100 may control the wireless communication unit 110 to transmit the control command to the device detected by the camera 121.

For example, the device detected by the camera 121 may correspond to the second device 600. Also, the controller may control the second device 600 to paste a temporarily stored data based on the control command applied to the first input unit 520. That is, the wireless communication unit 110 may control the wireless communication unit 110 to transmit a PASTE control command for outputting (or pasting) the part 23 of the data to the display unit of the second device 600 and to transmit a wireless signal associated with the part 23 of the data.

When the part of the data is output to the second device 600 in response to a touch input applied to the first input unit 520, the controller 180 may control the display unit 151 to restrict the output of the part of the data which has been output on the display unit.

When both of the first and second devices 500 and 600 are simultaneously viewed, the controller may control the display unit 151 to output the part of the data. The display unit 151 may output the part 23 of the image until when receiving the paste-related control command.

FIGS. 9A to 9D are conceptual views illustrating a control method based on a user gesture applied to a wearable glass-type device.

Hereinafter, a control method by a touch input applied to the glass-type terminal will be described with reference to FIG. 9A. A touch sensing unit which receives a user's touch input may be formed on one side of the main body 100' of the glass-type terminal 100 according to this exemplary embodiment. Referring to (a) of FIG. 9A, the controller 180 may activate a touch sensing mode by sensing a user's touch applied to the main body 100'. For example, when a user-intended touch is not applied, the controller may maintain the touch sensing mode in an inactive state. For example, a touch for activating the touch sensing mode may correspond to a long-touch input applied to a temple of the glass-type terminal for a preset time.

The controller 180 of the glass-type terminal 100 may output at least part of data displayed on an output device, which has been detected by the camera 121, to the display unit 151. For example, when a touch input is applied to the main body 100', if the first device 500 is detected by the camera 121, the controller 180 may control the wireless communication unit 110 to receive a wireless signal associated with the data output to the first output unit 510 of the first device 500. The data may correspond to screen information output to the first output unit 510 or a selected part of the screen information.

When the wireless signal associated with the data is received from the first device 500, the controller 180 may control the display unit 151 to output a part 23 of the data. The part 23 of the data may be output semitransparent.

The controller 180 may also control the memory 160 to (temporarily) store the part 23 of the data. In this case, the controller 180 may control the display unit to output a fourth indicator 24 indicating that the part 23 of the data has been stored.

Here, the touch input applied to the main body 100' may correspond to a continuous touch input which is applied in one direction along an extended shape of the temple of the glass-type terminal. Also, to store the data in the memory 160, a shape of a user's finger touched on the main body 100' may be set by the user. FIG. 9A illustrates that three fingers are touching the main body, but the present disclosure may not be limited to the example.

Figure 9A:
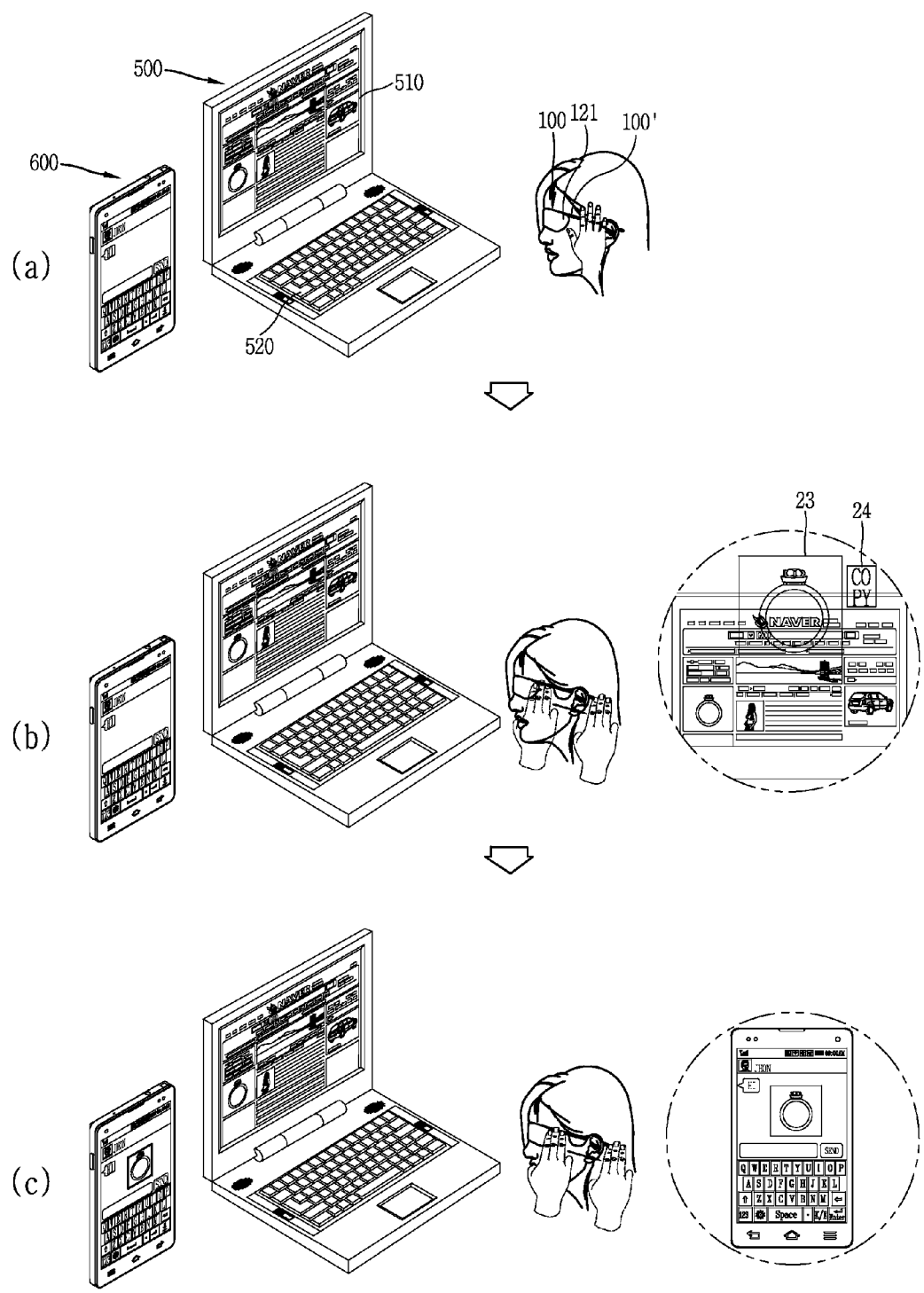

Referring to (c) of FIG. 9A, the controller 180 may form a control command for pasting the stored data 23 to the output device based on another touch input applied to the main body 100'. Also, the controller may transmit a wireless signal for outputting the data to a device detected by the camera 121 when another touch input is applied to the main body.

That is, while the second device 600 is detected by the camera 121 due to the movement of the user's eyes, if the another touch input is applied to the main body 100', the controller may control the wireless communication unit 110 to transmit the data 23 and a wireless signal associated with the control command for pasting the data to the second device 600.

Accordingly, the second device 600 may output the data 23 to the output unit thereof.

Here, the another touch input may correspond to a continuous touch input which moves opposite to the touch input illustrated in (b) of FIG. 9A. Also, the method of applying the touch input for pasting the data may not be limited to that illustrated.

Also, the control command generated by the touch input applied to the main body 100' may not be limited to COPY and PASTE, but various control commands may be defined by user settings. Meanwhile, the glass-type terminal 100 may form a control command by a user's gesture as well as the contactable touch input.

Hereinafter, description will be given of a method for controlling a glass-type terminal by sensing a user gesture with reference to FIGS. 9B and 9C.

The glass-type terminal illustrated in FIG. 9B may detect a gesture of a user's hand located on the display unit 151. For example, the controller 180 may analyze a gesture of a hand detected by the camera 121, or the terminal 100 may further include a sensor which senses the hand's gesture.

(a) of FIG. 9B illustrates a status that an external environment is imaged using the camera 121. The controller may detect a gesture of a hand located on the display unit 121.

The controller may set a focal point based on the gesture. For example, the controller may image the external environment by defining a region, on which a tip of the user's finger sensed in an overlapped state with the external environment is located, as the focal point.

Figure 9C:
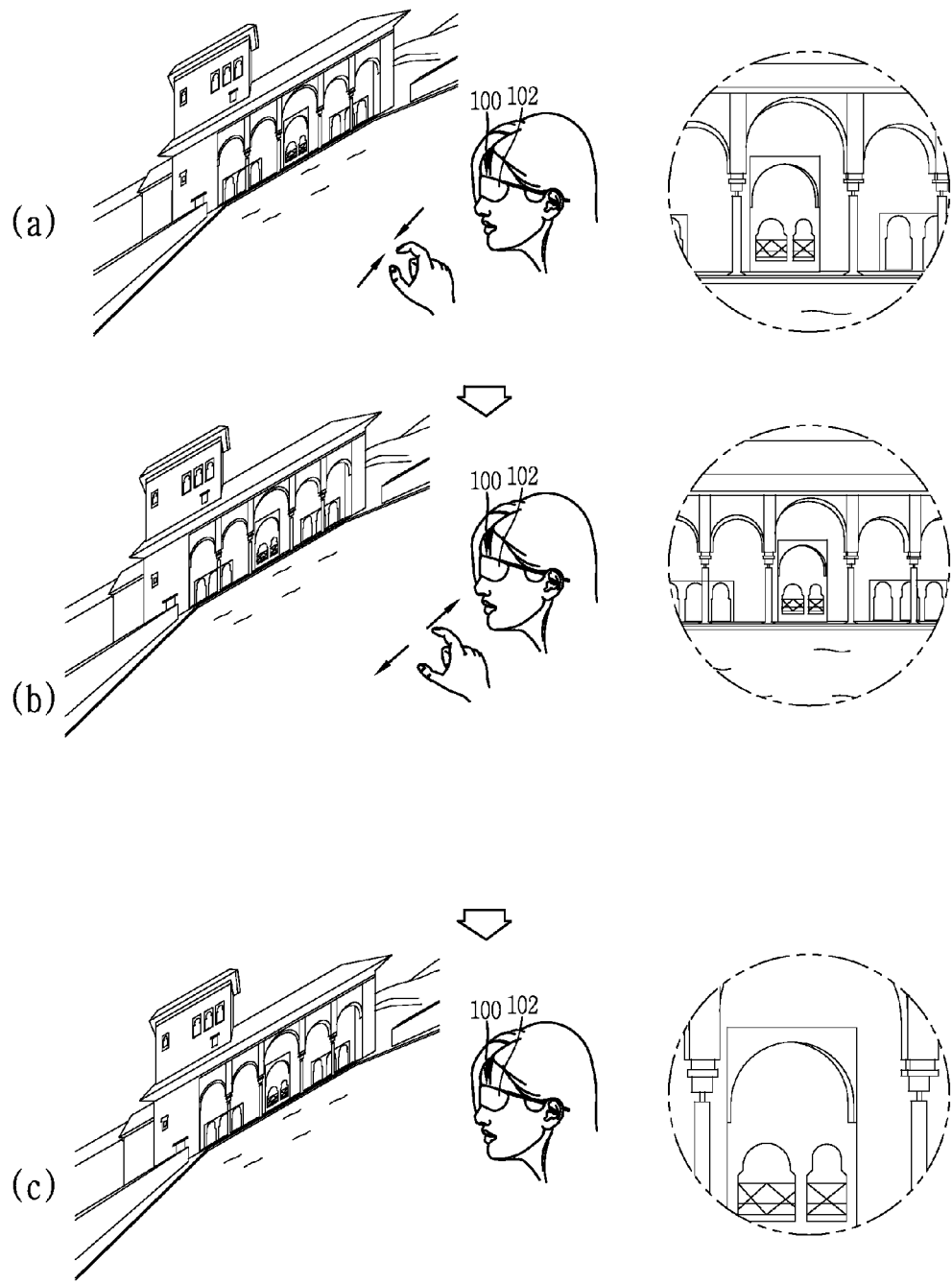

Referring to FIG. 9C, the controller 180 may control the camera 121 to be zoomed in or zoomed out based on a gesture.

Referring to (a) and (b) of FIG. 9C, the controller 180 may control the camera 121 to zoom out an object by sensing a gesture that two fingers are moved close to each other. Referring to (b) and (c) of FIG. 9C, the controller 180 may control the camera 121 to zoom in an object by sensing a gesture that two fingers are moved away from each other.

That is, the user may capture an image by a desired method using the hand's gesture while the camera is activated. Also, the captured image may be output to another device detected by the camera.

Hereinafter, a control method for outputting a captured image to an output device detected by the camera will be described with reference to FIG. 9D. (a) of FIG. 9D illustrates a status that an external environment is imaged using the camera 121 included in the glass-type terminal 100.

Figure 9D:
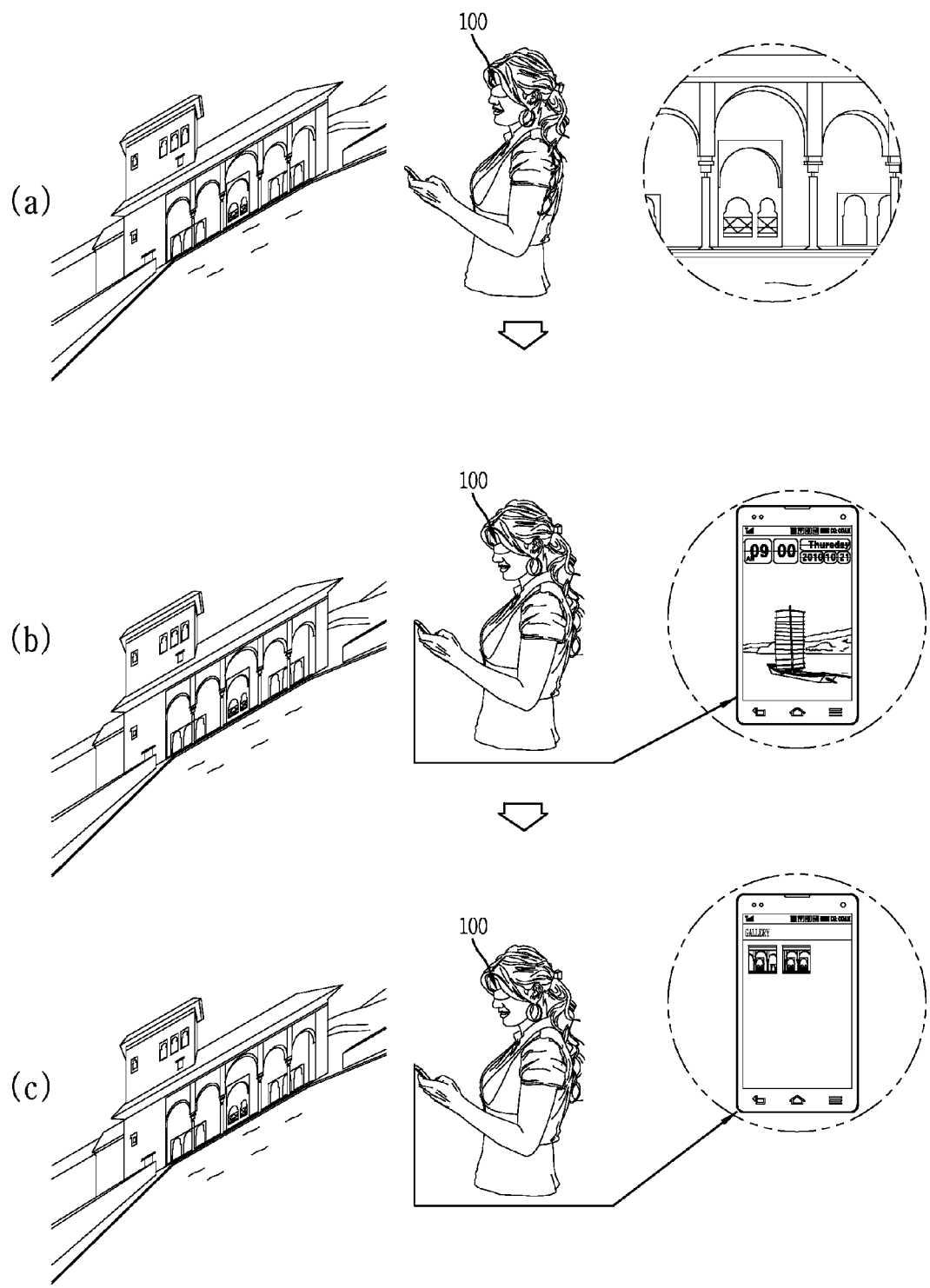

Referring to (b) and (c) of FIG. 9D, the controller 180 may store the image obtained by the camera 121 in the memory 160 of the glass-type terminal 100. Also, after the image is obtained, the output device detected by the camera 121 may output the image.

That is, when the output device is detected by the camera 121 for a preset time, the controller 180 may control the wireless communication unit 110 to transmit a wireless signal associated with the image to the output device.

Although not illustrated, upon reception of the wireless signal, the output device may store the image and output a window for checking whether or not to output the image.

When the wireless signal is received, the output device may store the image, and execute an application corresponding to a storage space of the image. That is, when the output device is continuously detected by the camera 121, the controller of the glass-type terminal 100 may transmit a control command for executing the application corresponding to the storage space where the image is stored.

That is, since it is allowed to transmit the stored data to the output device detected by the camera 121 to output the data, the user can transmit data to another device and also output data using another device without a separate storage step.

Figure 10:
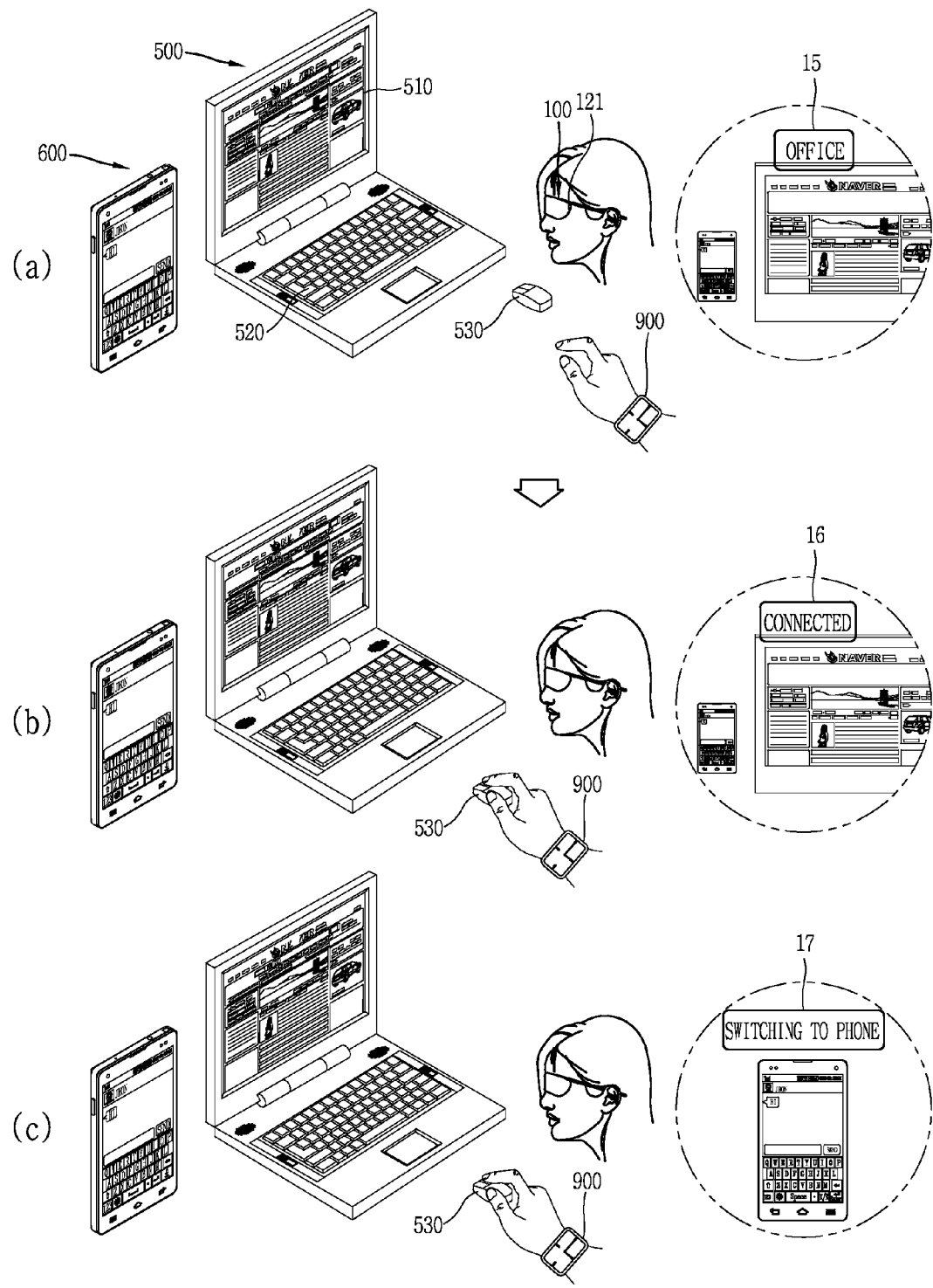
FIG. 10 is a conceptual view illustrating a control method for automatically executing user authentication through wireless connection between devices.

FIG. 10 is a conceptual view illustrating a control method for automatically executing user authentication through wireless connection between devices.

As illustrated in (a) of FIG. 10, the camera 121 may detect an external environment including at least one device. The controller 180 may analyze the external environment detected by the camera 121, and control the display unit 151 to output a fifth indicator 15 including current position information. Information included in the fifth indicator 15 may be preset by a user.

A system according to this exemplary embodiment may include a fifth device 900. For example, the fifth device 900 may correspond to a watch-type terminal which is worn on a user's wrist. The fifth device 900 may be wirelessly connected to the first and second devices 500 and 600 and the glass-type terminal 100 based on a user's control command. Also, the glass-type terminal 100 and the fifth device 900 which are worn on the user's body may be wirelessly connected to each other.

Referring to (b) of FIG. 10, when the input device 530 and the fifth device 900 are arranged adjacent to each other and wirelessly connected, the input device 530 may execute a user authentication procedure based on user-specific information which is stored in the fifth device 900. When the user of the fifth device 900 is authenticated by the input device 530 as being identical to a preset user, the system may wirelessly connect the first and second devices 500 and 600 to the glass-type terminal 100.

That is, the user may not have to carry out an authentication procedure using a password or the like for connecting the glass-type terminal 100 to the first and second devices 500 and 600.

Also, the controller 180 may control the display unit to output a fifth indicator 16 including information, which indicates that the glass-type terminal 100 and the first and second devices 500 and 600 have been wirelessly connected.

Referring to (d) of FIG. 10, when the second device 600 is detected by the camera 121 along the movement of the user's eyes, the controller 180 may control the display unit 151 to output a seventh indicator 17 including information, which indicates that a target to output the data thereon has changed to the second device 600.

For example, when the changed device is detected by the camera 121 for a preset time (for example, about 2 to 5 seconds) in response to the movement of the user's eyes, the controller may change the target device to which the data is to be output.

Accordingly, the user who uses a plurality of devices may be facilitated to change a target device, and to recognize a device, to which a control command is to be applied, by virtue of indicators.

The configurations and methods of the glass-type and the data output system including the same in the aforesaid embodiments may not be limitedly applied, but such embodiments may be configured by a selective combination of all or part of the embodiments so as to implement many variations.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A wearable glasses-type terminal comprising:
   a wireless communication unit;
   a camera configured to capture image data; and
   a controller configured to:
   receive input information from an external input device via the wireless communication unit;
   recognize a first external output device of a plurality of external output devices based on image recognition of the image data of the first external output device captured by the camera;
   transmit the input information to the first external output device via the wireless communication unit while the first external output device is recognized; and
   recognize a second external output device of the plurality of external output devices based on image recognition of image data of the second external output device captured by the camera; and
   continue transmitting the input information to the first external output device wherein the input information is not transmitted to the second external output device after recognizing the second external output device when the input information is continuously received from the external input device without a pause of at least a threshold length of time.

2. The terminal of claim 1, wherein the controller is further configured to transmit the input information contemporaneously with receiving the input information.

3. The terminal of claim 1, wherein the controller is further configured to transmit the input information to the second external output device and stop transmitting the input information to the first external output device when the input information is no longer being received and the second external output device is recognized.

4. The terminal of claim 1, further comprising a memory, wherein the controller is further configured to cause the memory to store an output of the first external output device captured by the camera, the output based on the transmitted input information.

5. The terminal of claim 4, wherein the controller is further configured to transmit, via the wireless communication unit, the stored output to the second external output device.

6. The terminal of claim 1, wherein the controller is further configured to activate the camera to capture an output of the first external output device when an event is received at the first external output device.

7. The terminal of claim 1, further comprising a touch sensor, wherein the controller is further configured to transmit a control command to the first external output device via the wireless communication unit in response to a first touch input detected by the touch sensor.

8. The terminal of claim 7, further comprising a memory, wherein the controller is further configured to:
   cause the memory to store screen information output by the first external output device in response to the first touch input; and
   transmit information related to the stored screen information to the second external output device in response to a second touch input detected by the touch sensor.

9. The terminal of claim 1, further comprising a display configured to allow a user to view a real world object there through, wherein the controller is further configured to cause the display to display a specific indicator corresponding to the recognized first external output device.

10. The terminal of claim 1, further comprising a display configured to allow a user to view a real world object there through, wherein the controller is further configured to cause the display to display the transmitted input information.

11. The terminal of claim 1, wherein the controller is further configured to transmit, via the wireless communication unit, data associated with an image captured by the camera to the first external output device.

12. The terminal of claim 11, wherein the controller is further configured to transmit the data in response to a hand gesture captured by the camera.

13. A data output system comprising:
a plurality of output devices;
an input device; and
a glasses-type terminal configured to be worn on a user's face, the terminal comprising:
a wireless communication unit;
a camera configured to capture image data corresponding to a viewing direction of the user; and
a controller configured to:
receive input information from the input device via the wireless communication unit;
recognize a first output device of the plurality of output devices based on image recognition of image data of the first output device captured by the camera; and
transmit the input information to the first output device via the wireless communication unit while the first output device is recognized:
recognize a second output device of the plurality of output devices based on image recognition of image data of the second output device captured by the camera; and
continue transmitting the input information to the first output device wherein the input information is not transmitted to the second output device after recognizing the second output device when the input information is continuously received from the input device without a pause of at least a threshold length of time.

14. The system of claim 13, wherein the controller is further configured to
transmit screen information of the first output device captured by the camera to the second output device.

15. The system of claim 13, wherein the controller is further configured to transmit control information related to controlling the first output device to the input device via the wireless communication unit.

16. The system of claim 15, wherein the input device comprises a touch screen configured to display an input interface for controlling the first output device based on the control information.

17. The system of claim 15, wherein
at least the first output device or the second output device displays a cursor based on the output device currently recognized by the controller.

18. The system of claim 15, wherein the controller is further configured to receive screen information from the first output device via the wireless communication unit in response to a control command to an icon displayed by the first output device.

19. The system of claim 18, wherein the glasses-type terminal further comprises a display and the controller is further configured to cause the display to display the screen information.

* * * * *